United States Patent [19]

Shemeta

[11] Patent Number: 4,753,013

[45] Date of Patent: Jun. 28, 1988

[54] ARTICLE PROFILE CHECKER

[75] Inventor: Paul J. Shemeta, Seattle, Wash.

[73] Assignee: The Boeing Company, Seattle, Wash.

[21] Appl. No.: 926,116

[22] Filed: Nov. 3, 1986

[51] Int. Cl.[4] .......... G01C 3/04

[52] U.S. Cl. .......... 33/551; 33/568; 33/548

[58] Field of Search .......... 33/551, 552, 553, 554, 33/172 E, 199 B, 568, 548; 209/531; 198/367

[56] References Cited

U.S. PATENT DOCUMENTS

| | | | |
|---|---|---|---|
| 2,346,583 | 4/1944 | Jackson | 33/548 |
| 3,135,055 | 6/1964 | Butler et al. . | |
| 3,164,909 | 1/1965 | Rosenberg | 33/568 |
| 3,371,419 | 3/1968 | Banks et al. . | |
| 3,470,739 | 10/1969 | Takafuji et al. | 73/159 |
| 3,681,582 | 8/1972 | Kimio et al. | 235/151.32 |
| 3,805,393 | 4/1974 | Lemelson . | |
| 3,869,802 | 3/1975 | Pirner . | |
| 3,920,971 | 11/1975 | Bevis et al. | 235/151.11 |
| 4,074,438 | 2/1978 | Takeda . | |
| 4,084,324 | 4/1978 | Whitehouse . | |
| 4,136,458 | 1/1979 | Bell et al. . | |
| 4,158,917 | 6/1979 | Tagliavini . | |
| 4,167,066 | 9/1979 | Cooper et al. . | |
| 4,356,556 | 10/1982 | Sterki | 364/560 |
| 4,377,911 | 3/1983 | Iida et al. . | |

*Primary Examiner*—William D. Martin, Jr.
*Attorney, Agent, or Firm*—Joan H. Pauly

[57] ABSTRACT

A fastener (100) slides down a tube (12) onto one end of a channel (16) formed in a V-shaped block (14). Movement of the fastener (100) along the channel (16) is retarded by two fingers (20, 26). A blade (38) moves along a slot (18) in the bottom of the channel (16) to push the fastener (100) along the channel (16) past a feeler (56). The feeler (56) is attached to a shaft (60) of a rotary transducer (58) to pivot therewith. A linear transducer (50) is actuated by longitudinal movement of the blade (38). The output of the transducers (50, 58) is compared by a computer to a predetermined output to check the profile of the fastener (100). A carriage (68) is moved to bring the infeed end (72) of a conduit (70) adjacent to the outfeed end of the block (14). The blade (38) pushes the fastener (100) into the conduit (70).

25 Claims, 7 Drawing Sheets

ARTICLE PROFILE CHECKER

DESCRIPTION

1. Technical Field

This invention relates to apparatus for checking the profiles of articles and, more particularly, to such apparatus in which an article is positioned on a path and is engaged by a push member that actuates a linear transducer and pushes the article along the path past a rotary transducer actuated by a feeler that contacts the article.

2. Background Art

There are a number of situations in which there is a need to check the profile of an article to verify its identity and/or orientation. One such situation is in a system for automatically retrieving fasteners, delivering them to an installation site, and installing them. In such an automatic system, it would generally be desirable to verify that each fastener is properly oriented and, when more than one type of fastener is being delivered, that the fastener is of the correct type. An incorrectly oriented fastener or a fastener of a wrong type could cause damage to the installation equipment or the workpiece in which the fastener is being installed. An automatic means for checking the identity and orientation of the fastener would be needed in order to take full advantage of the labor saving and cost saving aspects of an automated system and enable the system to operate at a maximum speed.

The patent literature includes numerous examples of systems for inspecting workpieces. Systems in which the position of a feeler or probe is sensed when it contacts a stationary workpiece are disclosed in U.S. Pat. No. 3,135,055, granted June 2, 1984, to G. L. Butler et al.; U.S. Pat. No. 3,681,582, granted Aug. 1, 1972, to K. Kimio et al.; U.S. Pat. No. 3,805,393, granted Apr. 23, 1974, to J. H. Lemelson; U.S. Pat. No. 3,869,802, granted Mar. 11, 1975, to H. G. Pirner; U.S. Pat. No. 3,920,971, granted Nov. 18, 1975, to R. C. Bevis et al.; U.S. Pat. No. 4,136,458, granted Jan. 30, 1979, to F. K. Bell et al.; and U.S. Pat. No. 4,167,066, granted Sept. 11, 1979, to L. E. Cooper et al. Systems in which movement of a probe or stylus that contacts a workpiece is sensed while there is relative movement between the workpiece and the probe or stylus carrier are disclosed in U.S. Pat. No. 4,074,438, granted Feb. 21, 1978, to Y. Takeda; U.S. Pat. No. 4,084,324, granted Apr. 18, 1978, to D. J. Whitehouse; U.S. Pat. No. 4,158,917, granted June 26, 1979, to A. Tagliavini; and U.S. Pat. No. 4,356,556, granted Oct. 26, 1982, to A. Sterki.

U.S. Pat. No. 3,371,419, granted Mar. 5, 1968, to H. E. Banks et al. discloses a gauge for measuring the diameters and detecting out-of-round conditions of cylindrical objects. The object is positioned on a spring biased idler arm and is rotated by a fixed drive wheel. Movement of the idler arm caused by contact with the rotating object is sensed by a linear transducer in contact with the arm.

U.S. Pat. No. 3,470,739, granted Oct. 7, 1969, to H. Takafuji et al. discloses apparatus for measuring the shape of sheet-like members. The sheet-like workpiece and sensing apparatus are moved relative to each other to move the sensing apparatus along the sheet. Rotary and/or linear transducers carried by the sensing apparatus sense the gradient of the sheet at discrete intervals, and the sensed gradients are used to calculate the waviness of the sheet.

U.S. Pat. No. 4,377,911, granted Mar. 29, 1983, to J. Iida et al. discloses an instrument for measuring the contour of a workpiece. A stylus on the end of a rotatable arm is pressed against the workpiece, and the arm is moved axially. Vertical movement of the stylus caused by contact with the workpiece is measured by the rotation of the arm. The measured vertical movement and the axial movement of the arm are used to calculate the contour of the workpiece.

The above-cited patents and the prior art that is discussed and/or cited therein should be studied for the purpose of putting the present invention into proper perspective relative to the prior art.

3. Disclosure of the Invention

The subject of the invention is apparatus for checking the profile of an article. According to an aspect of the invention, the apparatus comprises a push member for engaging the aritcle and drive means for moving the push member in a linear direction to push the article along a path. A linear transducer is actuated by movement of the push member in said linear direction. A feeler is mounted to pivot about an axis and has a free end positioned to be contacted by the article as the article moves along the path. A rotary transducer is actuated by pivotal movement of the feeler about the axis caused by contact with the article.

Preferably, the apparatus further comprises positioning means for positioning the article on the path to be engaged by the push member. The preferred embodiment of the positioning means includes guide means for guiding the article onto the infeed end of the path, and retarding means for retarding movement of the article along the path to enable the article to be engaged by the push member. The retarding means may comprise a pivotably mounted finger having a free end that extends downwardly and in an outfeed direction into the channel. The inclusion of positioning means in the apparatus of the invention facilitates integration of the apparatus into a fully automated system in which the articles to be checked are retrieved and fed to the apparatus by automatic means. The preferred form of the positioning means allows the speed of the movement of the article when it is contacting the feeler to be accurately controlled by the drive means which moves the push member.

The apparatus preferably includes a block having an upwardly facing channel that defines the path and a slot extending longitudinally along the bottom of the channel. The push member comprises a blade that extends upwardly through the slot into the channel and is movable along the slot to push an article in the channel along the path. In the preferred embodiment, the block is V-shaped, and the channel is upwardly facing and downwardly tapering. This preferred configuration has the advantage of readily accommodating articles of various sizes, such as cylindrical members of differing diameters.

A preferred feature of the invention is drive means which comprises a reciprocating fluid actuated piston rod. The push member is attached to the piston rod to move therewith. The linear transducer includes a shaft that extends parallel to and is spaced from the piston rod and that is also attached to the push member.

Another preferred feature of the invention is a rotary transducer that includes a shaft that defines the axis about which the feeler moves and that is attached to the feeler to pivot therewith. The feeler is in the form of a finger that extends downwardly and in an outfeed direction from the shaft. Preferably, the free end of the finger is biased into the path.

In order to be compatible with a fully automated system, the apparatus preferably includes means for comparing output from the linear transducer and the rotary transducer to a predetermined output, and means for transporting the article to a location determined by the results of comparing such outputs. The preferred embodiment of the means for transporting comprises a carriage and a plurality of conduits each of which has an infeed end mounted on the carriage. Drive means moves the carriage to selectively position one of the infeed ends adjacent to the outfeed end of the path.

The apparatus of the invention provides a quick and accurate means for verifying the identity and/or orientation of an article. The apparatus may be readily incorporated into a fully automated system and may be used to check articles of various sizes and configurations. The structure of the apparatus is relatively simple, compact, and durable. The apparatus is substantially unaffected by buildup of debris, such as dust and lubricant from the articles being processed, and, thus, can be operated for relatively long periods of time without requiring maintenance. The apparatus is easy and inexpensive to manufacture, calibrate, and maintain. In addition, the operation of the apparatus is relatively simple and inexpensive to carry out, and the output of the transducers may be readily processed at a reasonable cost by use of a reasonably small computer.

These and other advantages and features will become apparent from a detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

Figure 3:
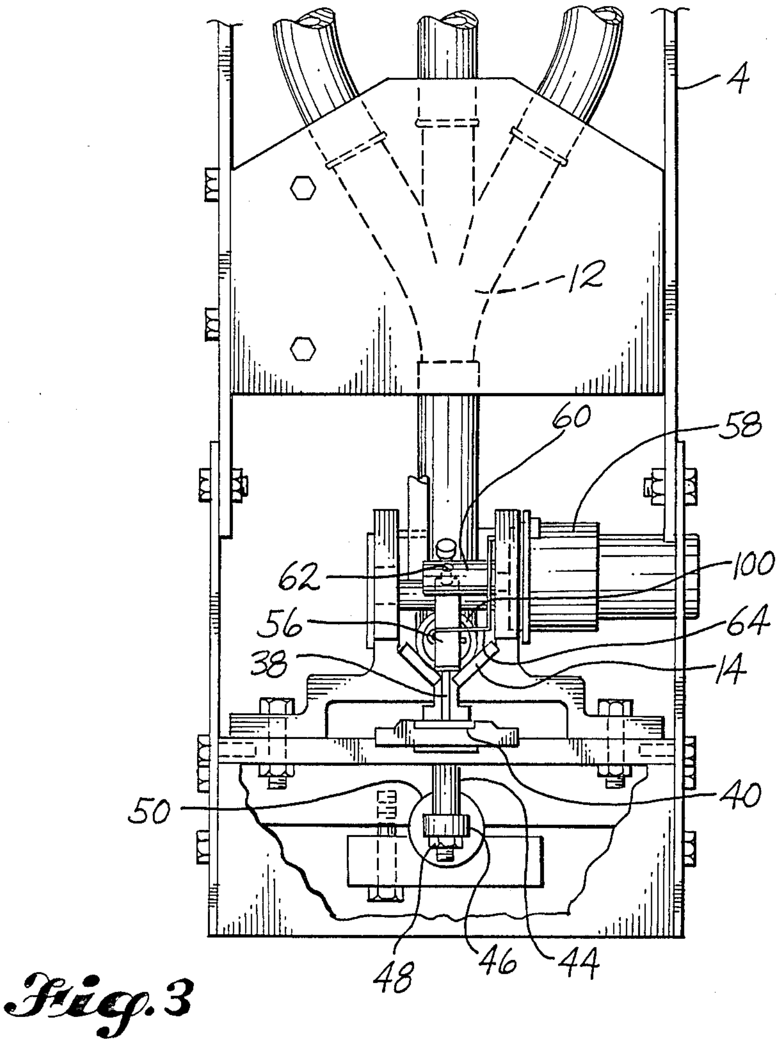
FIG. 3 is a front view of the apparatus shown in FIG. 2, with lower foreground portions cut away.
Figure 4:
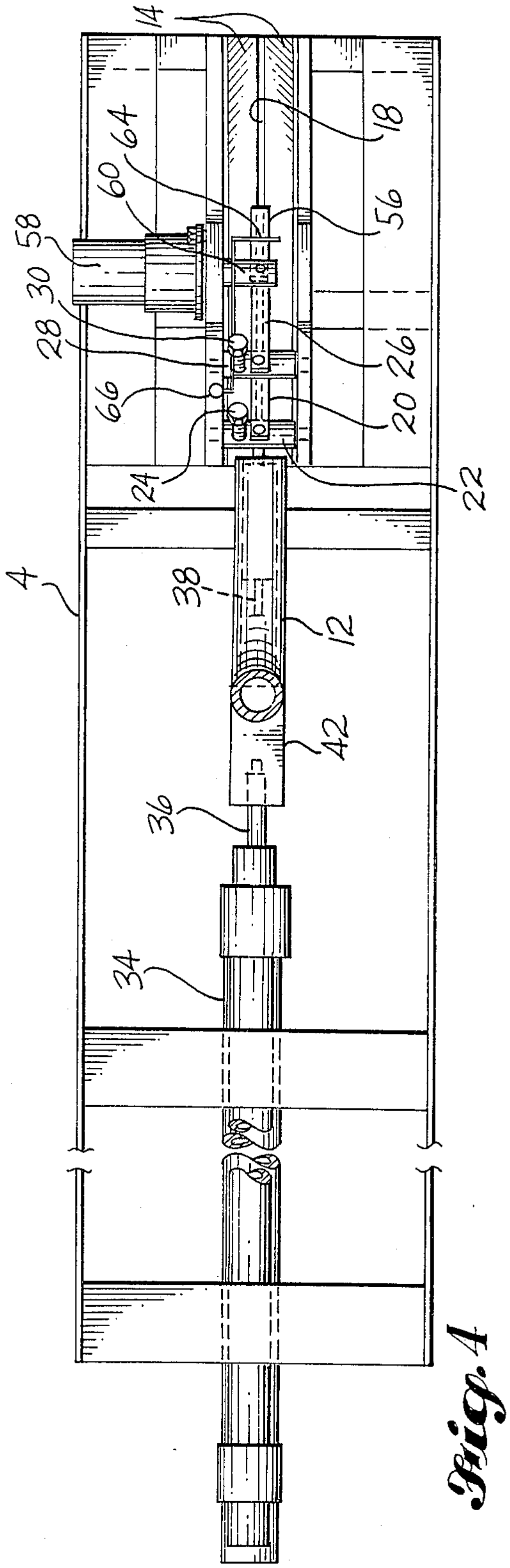
FIG. 4 is a top plan view of the apparatus shown in FIGS. 2 and 3, excluding the upper frame members and upper portions of the infeed tube.

The drawings show apparatus that is constructed according to the invention and that also constitutes the best mode of the invention currently known to the applicant. The apparatus shown in the drawings is designed for checking the identity and orientation of fasteners, such as the threaded countersink fastener 100 shown in FIGS. 3, 6, and 7. It is anticipated that the primary use of the apparatus of the invention will be as a fastener checker in an automated fastener installation system. However, it is of course to be understood that the apparatus of the invention may also be used to check the profiles of other types of articles and may be adapted to be incorporated into other types of systems.

The preferred embodiment of the apparatus of the invention shown in the drawings includes a frame 4 on which a guide tube 12 is mounted. A suitable mechanism (not shown) conveys fasteners into the tube 12 one at a time and, preferably, orients the headed fasteners. An example of such a mechanism is the device disclosed in the copending United States patent application of the applicant and Daniel A. Hendricks, Ser. No. 797,962, filed Nov. 14, 1985. Each fastener slides down through the tube 12 and onto the infeed end of a V-shaped block 14. Movement of the fastener along the block 14 is retarded by fingers 20, 26, and then the fastener is pushed along the block 14 by push means 32 to check the profile of the fastener and, in the case of a headed fastener, the orientation of the fastener.

The block 14 is mounted on and extends along the forward portion of the frame 4. The block 14 has two opposite walls that form an upwardly facing, downwardly tapering channel 16 that defines a path along which the fastener is pushed during the sensing operation. A slot 18 extends longitudinally along the bottom of the channel 16. A push member or blade 38 extends upwardly through the slot 18 into the channel 16 and is movable along the slot 18 to push a fastener along the channel 16. The apparatus includes drive means for moving the blade 38 in a linear direction along the slot 18 to push the fastener.

Figure 2:
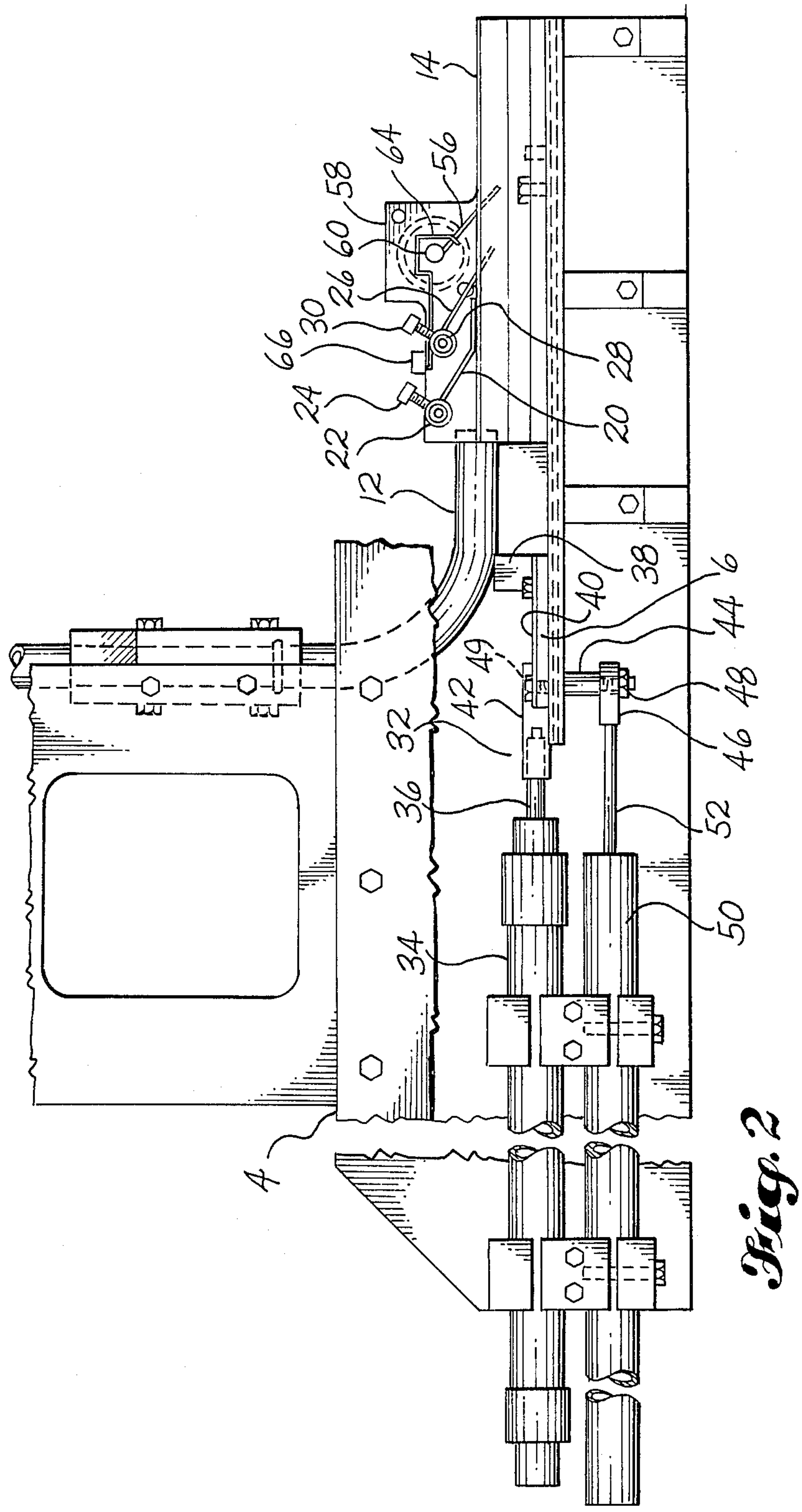
FIG. 2 is a side elevational view of the preferred embodiment, with the output carriage omitted and foreground portions cut away to reveal the push drive means and the linear transducer.
Figure 5:
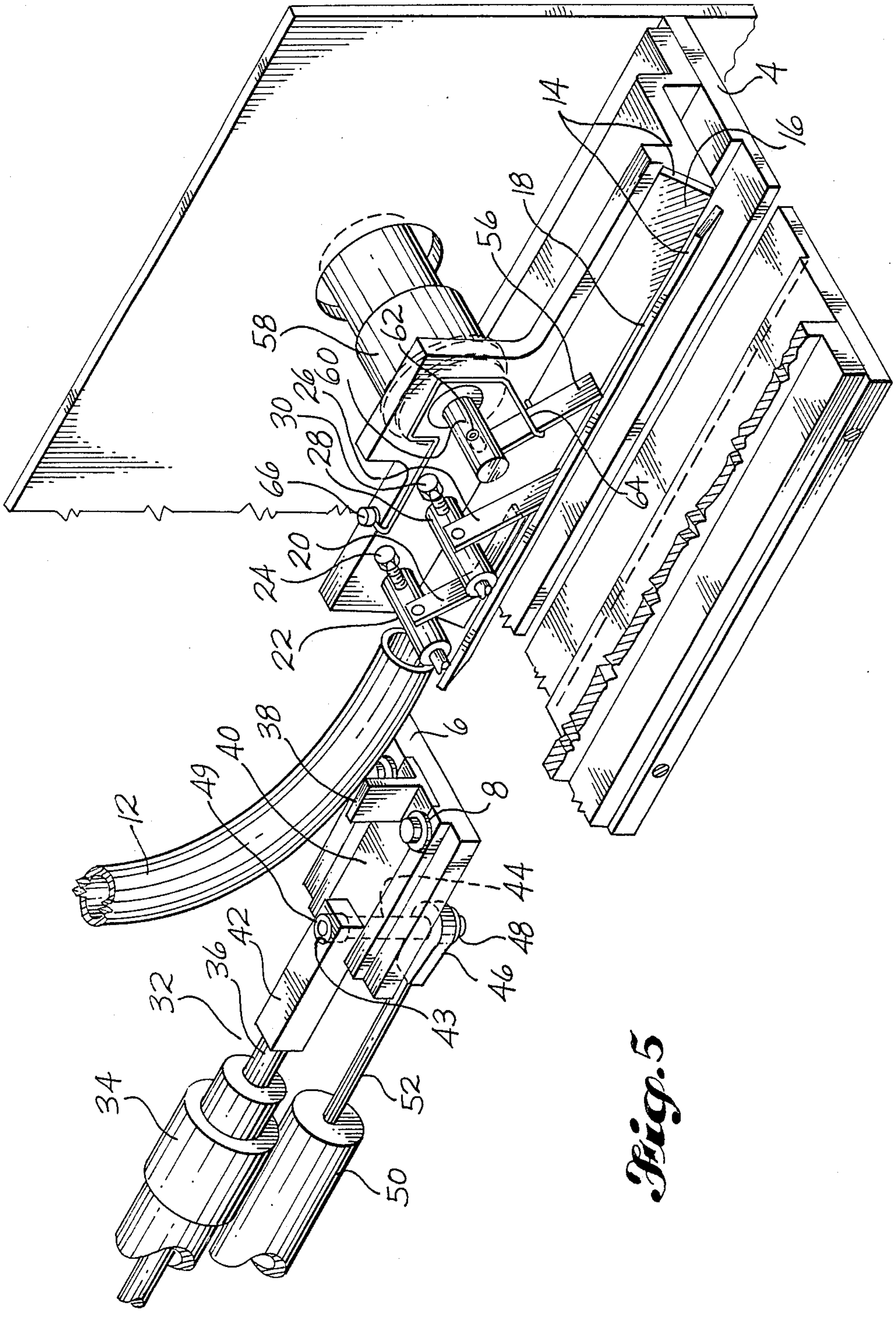
FIG. 5 is a fragmentary pictorial view of the apparatus shown in FIGS. 2–4.

The preferred embodiment of the push means 32 is most clearly shown in FIGS. 2 and 5. The push means 32 includes a double acting pneumatic cylinder 34 which reciprocates a piston rod 36. The lower portion of the blade 38 is attached to the piston rod 36 to reciprocate with the piston rod 36. The connection between the piston rod 36 and the blade 38 is accomplished by means of a flat push block 40 and a cylinder fitting 42. The free end of the piston rod 36 is received into a suitable opening in the rear end of the fitting 42, and the front end of the fitting 42 engages the block 40. The blade 38 is mounted on and extends upwardly from the front portion of the block 40. FIGS. 2 and 5 show the piston rod 36 and the attached blade 38 in a retracted position. When the cylinder 34 is activated to move the blade 38 in a forward or outfeed direction to move a fastener along the channel 16, the blade 38 slides into and along the slot 18. The block 40 is attached to a guide member 6 by fastening means 8. The guide member 6 slides along the frame 4 beneath the slot 18.

The longitudinal movement of the piston rod 36 and the attached blade 38 actuates a linear transducer 50. The output of the transducer 50 provides a measure of the axial position of the blade 38 and a fastener being pushed thereby. Transducer 50 includes a rod 52 that extends parallel to and is spaced below the piston rod 36. The rod 52 is attached to the blade 38 via a rod fitting 46, a vertical pin 44, and the push block 40 on which the blade 38 is mounted. This connection and the connection between the piston rod 36 and the block 40 causes reciprocating movement of the piston rod 36 to create corresponding movement of the rod 52. The free end of the rod 52 is received into a suitable opening in the rod fitting 46. The lower threaded end of the pin 44 is threaded into a hole in the rod fitting 46 and is secured to the fitting 46 by a nut 48. The upper threaded end of the pin 44 threadedly engages the push block 40 and a bushing 49. The bushing 49 is received into an opening 43 in the cylinder fitting 42 and functions to prevent the fitting 42 from bearing on the threads.

As noted above, the tube 12 guides a fastener down onto the infeed end of the path formed by the V-shaped block 14, and movement of the fastener along the path is retarded by two metal fingers 20, 26. The fingers 20, 26 are most clearly shown in FIGS. 2 and 5. Each finger 20, 26 has an upper end that is attached to a shaft 22, 28. Each shaft 22, 28 is pivotably mounted on the frame 4 of the apparatus above the V-shaped block 14 and extends horizontally perpendicular to the channel 16. The shaft 28 is spaced longitudinally in an outfeed direction from the shaft 22. The finger 26 is straight and extends downwardly and in an outfeed direction from the shaft 28 to position its lower free end in the channel 16 in the path of the fastener. The finger 20 extends from the shaft 22 downwardly and in an outfeed direction parallel to the finger 26 and then bends to extend in a horizontal direction under the shaft 28 toward the finger 26. Each shaft 22, 28 is weighted to increase its inertia and provide resistance to pivoting of the attached finger 20, 26, to thereby slow movement of a fastener contacting the finger 20, 26. In the preferred embodiment, the weighting of the shafts 22, 28 is accomlished by securing a bolt 24, 30 to each shaft 22, 28. The bolts 24, 30 also serve to return the shafts 22, 28 to their equilibrium positions after a fastener clears the fingers 20, 26. Stops (not shown) may be provided to limit pivotal movement of the finger 20. Preferably, operation of the apparatus is timed so that the blade 38 is moved in an outfeed direction to engage a fastener as the fastener is being slowed by the fingers 20, 26. Therefore, the fingers 20, 26 need only retard movement of the fastener and do not necessarily actually stop the fastener.

The blade 38 engages a fastener that has been slowed by the fingers 20, 26 and pushes it into contact with and past a feeler or finger 56 which pivots in response to contact with the fastener. The pivotal movement of the finger 56 actuates a rotary transducer 58. The transducer 58 includes a shaft 60 that extends above and laterally across the V-shaped block 14 parallel to the shafts 22, 28. The upper end of the finger 56 is removably secured to the shaft 60 by a suitable fastener 62. The attachment is releasable to allow quick and easy replacement of the finger 56 should it become worn or damaged. The finger 56 extends downwardly and in an outfeed direction from the shaft 60 to position its lower free end in the path formed by the channel 16. Pivotal movement of the finger 56 caused by contact with a fastener causes a corresponding pivoting of the shaft 60 to actuate the transducer 58. The shaft 60 is provided with spring means to yieldably resist pivotal movement of the shaft 60 and the finger 56 about the axis of the shaft 60 and bias the free end of the finger 56 into the path of the fastener. As shown in the drawings, the spring means comprises a piano wire spring 64 having one end hooked onto the finger 56 and another end attached to a post 66.

Each of the fingers 26, 56 is preferably in the form of a flat strip of steel. The finger 20 is preferably a flat steel strip with an angular bend as shown in FIG. 2 and described above. The strips 20, 26 are sufficiently rigid to retard the movement of the fastener. The feeler strip 56 is sufficiently rigid to resist flexing when it contacts the fastener so that pivotal movement of the strip 56 accurately reflects the profile of the fastener.

Preferably, the apparatus of the invention also includes a computer that is programmed to compare the output from the linear transducer 50 and the rotary transducer 58 to a predetermined output. The predetermined output is based on the ideal profile of the type of fastener and fastener orientation currently required by the system. If the output from the transducers 50, 58 is within preset tolerances of the ideal profile, the fastener is transported to a location for further processing. If the profile is not within the tolerances, it is removed from the system and another fastener is selected and checked.

Figure 1:
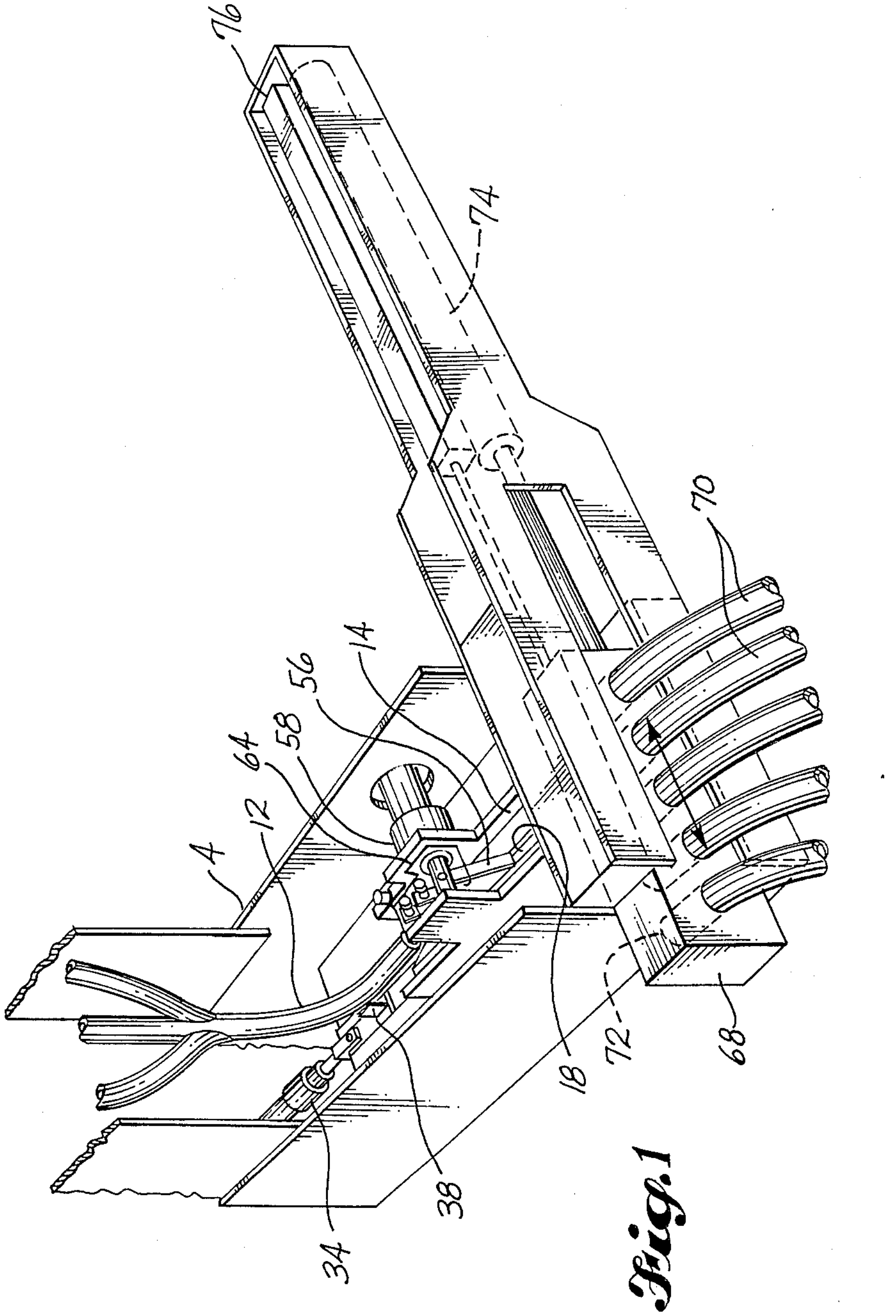
FIG. 1 is a pictorial view of the preferred embodiment of the apparatus of the invention, with background portions omitted.

FIG. 1 shows the preferred means for transporting the fastener to the location determined by the results of comparing the predetermined output and the output of the transducers 50, 58. A carriage 68 is positioned at the outfeed end of the V-shaped block 14. Passageways from the outfeed end of the block 14 to the various locations to which the fastener may be sent are provided by a plurality of conduits or tubes 70. Each conduit 70 has an infeed end 72 mounted on the carriage 68 and opening onto a face of the carriage 68. A pneumatic cylinder 74 moves the carriage 68 to selectively position one of the infeed ends 72 adjacent to the outfeed end of the channel 16 in the V-shaped block 14. A linear transducer 76 senses the position of the carriage 68. In the apparatus shown in FIG. 1, there are five conduits 70 provided. Four of the conduits lead to stations in the installation part of the system, and the fifth conduit leads to a discard location. The former four conduits each receive a different kind of fastener. For example, separate conduits may be provided for small slug rivets, large slug rivets, headed fasteners with threads, and headed fasteners without threads, each of which requires different handling in the installation process.

Figure 6:
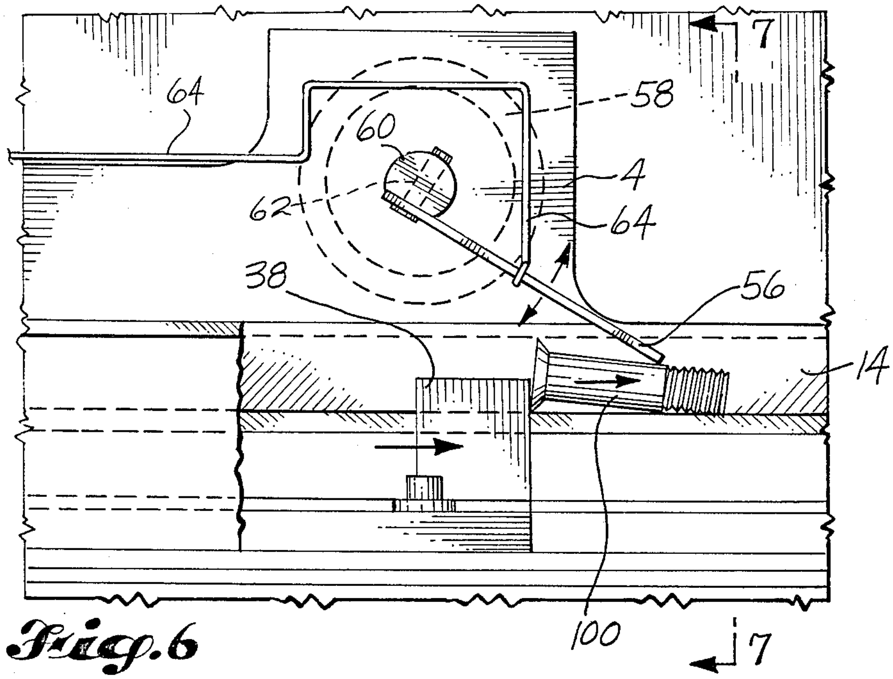
FIG. 6 is a side elevational view of the sensing portion of the apparatus shown in FIGS. 1–5, with foreground portions of the frame and the foreground half of the V-block removed.
Figure 7:
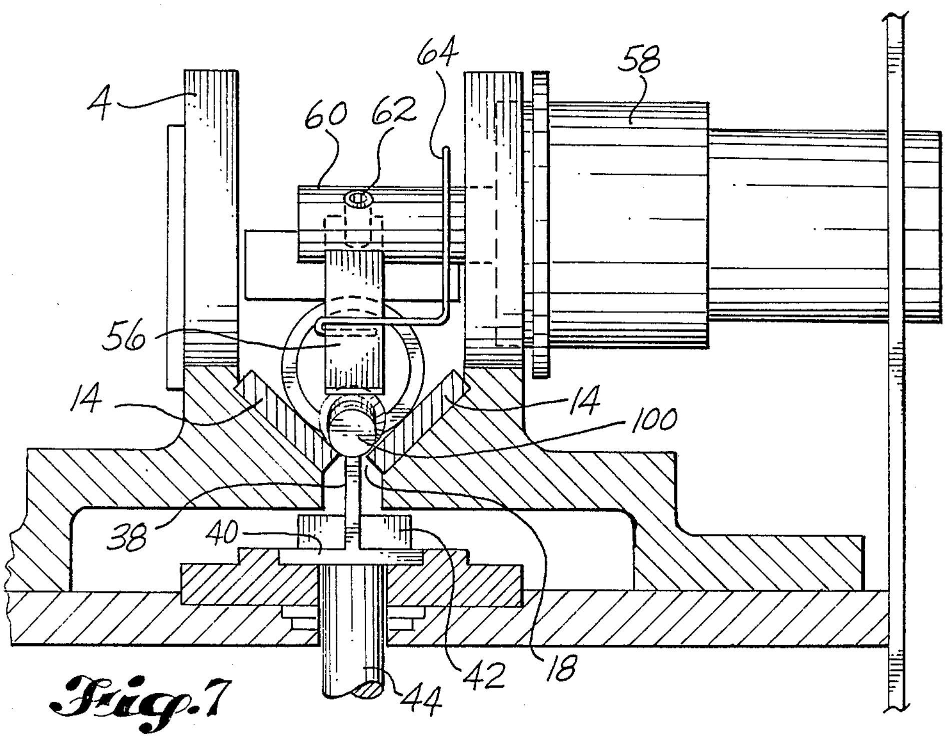
FIG. 7 is a sectional view taken along the line 7—7 in FIG. 6, including most of the foreground portions not shown in FIG. 6.
Figure 8:
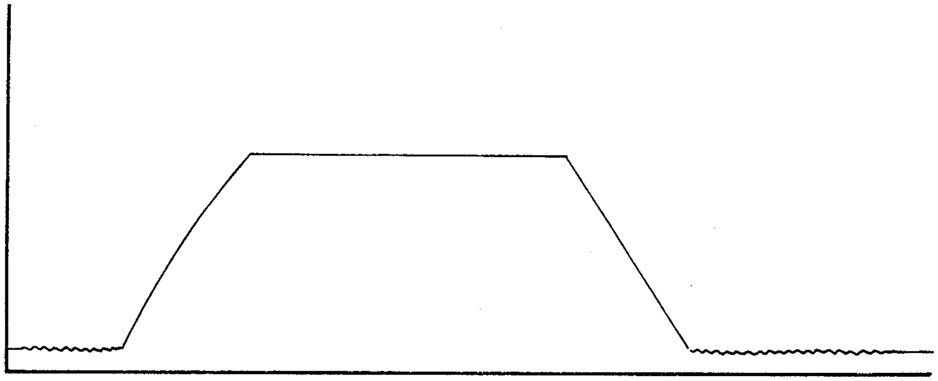
FIGS. 8 and 9 are graphs showing the output of the transducers for two different types of fasteners.
Figure 9:
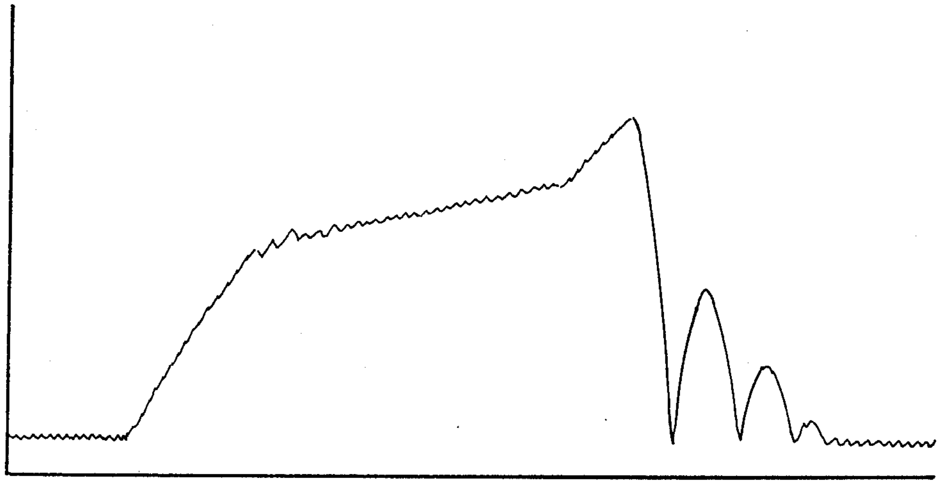

The operation of the apparatus of the invention should be apparent from the above description. In summary, a fastener is introduced into and slides down the tube 12 into the channel 16 of the V-shaped block 14. While the fastener is being delivered to the apparatus, the controller activates the cylinder 74 to move the carriage 68 and bring the infeed end 72 of the appropriate conduit 70 for the desired fastener type adjacent to the outfeed end of the channel 16. Movement of the fastener along the channel 16 is retarded by the fingers 20, 26. The controller activates the cylinder 34 to move the blade 38 to push the fastener along the channel 16. FIGS. 6 and 7 illustrate the blade 38 pushing a headed fastener 100 past the feeler 56. Before the fastener reaches the outfeed end of the channel 16, the computer compares the output of the linear and rotary transducers 50, 58 to the predetermined output to check the profile and orientation of the fastener 100. If the fastener is within preset tolerances, the cylinder 34 continues to push the fastener 100 into the conduit 70. If the sensed output is not within such tolerances, the cylinder 34 is deactivated to stop the fastener at the outfeed end of the channel 16, the cylinder 74 is activated to reposition the carriage 68 with the infeed end 72 of the discard conduit 70 adjacent to the channel 16, and then the cylinder 34 is reactivated to push the fastener into the discard conduit 70. After the fastener has been pushed into the appropriate conduit 70, the blade 38 is moved back into its retracted position, shown in FIGS. 2 and 5, to prepare the apparatus for receiving another fastener. FIGS. 8 and 9 are graphs showing the output profiles for two different types of fasteners, a ¼ inch slug rivet and a 5/16 inch threaded bolt, respectively.

Figure 10:
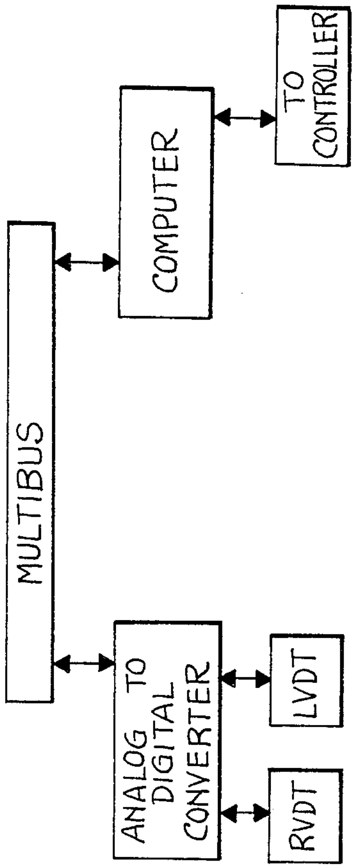
FIG. 10 is a simplified schematic diagram of the data processing and control portions of the preferred embodiment.

FIG. 10 is a simplified schematic diagram of the data processing and control portions of the preferred embodiment of the system of the invention. The output of the rotary transducer (RVDT) and the linear transducer (LVDT) is fed into an analog to digital convertor which communicates with the computer via multibus. The computer in turn communicates with a programmable controller. Examples of suitable RVDT and LVDT devices are the Schaevitz Model R30D rotary variable differential transformer and the Schaevitz Model 3000 DC-D linear variable differential transformer, respectively. A bushing is positioned on the shaft of the Schaevitz RVDT to modify it for mounting the feeler 56. In the preferred embodiment, the analog to digital convertor is an Analog Devices Model RTI-711 convertor. The computer that processes the converted output of the transducers is provided separately from the programmable controller because the programmable controller that is included in the preferred embodiment of the system lacks sufficient speed to process the data in the time required for proper operation of a fully automated system. The preferred embodiment of the computer was chosen for its processing speed and is the Omnibyte Model 0B68K1A 68000 single board computer. The computer works in conjunction with and is a slave to the programmable controller, which in the preferred embodiment is an Allen-Bradley PLC 2/30 programmable controller. The computer program for processing the inspection data is written entirely in 68000 assembly code. The best mode of the program currently known to the applicant accompanies this application as an Appendix.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

APPENDIX

Computer Program for
U.S. Patent Application of
Paul J. Shemata

Entitled:

"Article Profile Checker"

```
Main Program:         16 pages
Storage Program:       2 pages

Program Language:     68000 Assembly Code
Computer Type:        Omnibyte Model 0B68K1A 68000
                      Single Board Computer
```

```
 AGE      1     LIST VE  ) 081282 4   10/ 3/86   08:01:     SYS:0450..FSFS.SA


***********************************************************************
*                                                                     *
*       68000 FASTENER SELECTION & FEED SYSTEM (FSFS)                 *
*                                                                     *
*       This program is for processing the A/D information for       *
*       fastener inspection with go/nogo output to an AB controller  *
*                                                                     *
*       The name of this file is FSFS                                 *
*                                                                     *
***********************************************************************
FSFS     IDNT       1,0
         SECTION    8
         XDEF       FSFS

*INITIALIZING AND VECTOR TRANSFER PROGRAM

*        SECTION FSFSEPR
*        GEN.L
*        XREF      ROMVECT,MAIN,START,ETRAP
*BELOW A LIST OF GLOBALS ALSO USED IN FSFSRAM
*FIRST A LIST OF RAM TABLES
         XREF       READBUF    8 BYTES, SERIAL COMMAND WORD INPUT BUFFER
         XREF       WRITEBUF   8 BYTES, SERIAL RESPONSE OUTPUT BUFFER

*BELOW A LIST OF VARIABLES
         XREF       CHARPT     B,CHARACTER POINTER
         XREF       DIACAL     W,DIAMETER CALIBRATION DATA
         XREF       DOPW       B,OUTPUT BYTE TO PIAO
         XREF       FASCMD     W,FASTENER NUMBER COMMAND WORD
```

```
         XREF      FASNO      B,FASTENER NUMBER
         XREF      HEDCAL     W,HEAD DIAM CALIBRATION DATA
         XREF      LASTL      W,LAST LVDT RECORDED
         XREF      LASTR      W,LAST RVDT RECORDED
         XREF      LENCAL     W,LENGTH CALIBRATION DATA
         XREF      LVDT1      W,INITIAL LENGTH MEAS POINT
         XREF      PACER      W,100 MS DELAY TIME MARKER
         XREF      MSTAT      B,MEASUREMENT STATUS BYTE
         XREF      SSTAT      B,SEQUENCE STATUS BYTE
         XREF      RVDTBL     W,BASELINE FOR RVDT MEAS
         XREF      RVDTMI     W,NEG PEAK OF RVDT THREAD MEAS
         XREF      RVDTPL     W,POS PEAK OF RVDT THREAD MEAS
         XREF      TOLADJ     B,TRIMMER FOR DIMENSION TOLERENCE
ACIAO     EQU      $FFFF01    ACIAO BASE ADDR
*BELOW A LIST OF CONSTANTS
ADADDR    EQU      $FFF700    A/D CONV BASE ADDR
ACIA1     EQU      $FFFF01    ACIAO BASE ADDR
ACIAOM    EQU          $95    ACIAO COMMAND OP MODE
CHARCT    EQU            5    READ/WRITE CHARACTER COUNTER
DIMTOL    EQU           18    DIMENSION TOLERANCE
DLYCT     EQU           45    45 MS DELAY COUNT
LLOPCT    EQU           25    LONG LOOP START NUMBER
LOOPCT    EQU           15    LOOP START NUMBER
SETSTAT   EQU        $2000    PROCESSOR STATUS:SUPV STATE
*                             ALL INTERRUPTS ENABLED
INHIB     EQU        $2700    PROCESSOR STATUS:SUPV STATE
*                             ALL INTERRUPTS INHIBITED
TIMCNT    EQU      1000       1 MS COUNTER VALUE
TIMER     EQU      $FFFF61    TIMER BASE ADDRESS
TIMODE    EQU      $42        TIMER MODE
THRESH    EQU      3          THRESHOLD BASELINE DEPARTURE
PIAO      EQU      $FFFF41    PIAO BASE ADDRESS
RAMVECT   EQU      0          LOCATION FOR EXCEPTION VECTORS
ROMVECT   EQU      $FE0000


         DC.L      $20000     *STACK POINTER
         DC.L      START      *RESET START ADDRESS
         DC.L      ETRAP      *ERROR TRAP VECTORS
         DC.L      ETRAP
         DC.L      ETRAP
         DC.L      ETRAP
         DC.L      ETRAP
         DC.L      ETRAP
         DC.L      ETRAP
         DC.L      ETRAP
         DC.L      ETRAP
         DC.L      ETRAP
         DC.L      0          *NEXT 11 RESERVED BY MOTOROLA
         DC.L      0
         DC.L      0
         DC.L      0
         DC.L      0
         DC.L      0
         DC.L      0
         DC.L      0
         DC.L      0
         DC.L      0
         DC.L      0
         DC.L      0
         DC.L      ETRAP
         DC.L      ETRAP      *AUTO VECTOR 1
         DC.L      ETRAP
         DC.L      ETRAP
         DC.L      MAIN       *75 MS TIMER INTERRUPT
         DC.L      CMDINT     *COMMAND WORD INTERRUPT
         DC.L      ABINT      *ALLEN BRADLEY PLC INTERRUPT
         DC.L      ETRAP      *AUTO VECTOR 7

FSFS     EQU       *
ETRAP    MOVE.W    #INHIB,SR           MASK ALL INTERRUPTS
         JMP       PIA
```

```
START    MOVE.W   #INHIB,SR            MASK ALL INTERRUPTS
         LEA      RAMVECT,A0           COPY VECTOR TABLE INTO RAM
         LEA      ROMVECT,A1
         MOVE.L   #30,D0
COPVECT  MOVE.L   (A1)+,(A0)+
         DBF      D0,COPVECT

*BELOW A ROUTINE TO SET UP THE PARALLEL I/O PORT

PIA      MOVE.B   #0,PIA0+4            CLEAR BY ADDR DDR PIAOA
         MOVE.B   #0,PIA0              SETS DATA DIR REG AS INPUT
         MOVE.B   #7,PIA0+4            SETS READ STROBE,CA1 RESTORE
         MOVE.B   PIA0,D0              READ TO RESET INTERRUPT
         MOVE.B   #0,PIA0+6            CLEAR BY ADDR DDR PIAOB
         MOVE.B   #255,PIA0+2          SETS DATA DIR REG AS OUTPUT
         MOVE.B   #4,PIA0+6            SETS WRITE STROBE,CA1 RESTORE
         MOVE.B   #255,DOPW
         MOVE.B   DOPW,PIA0+2          OUTPUTS ALL HIGH LEVELS

*BELOW A ROUTINE TO SET UP THE SERIAL PORT

         MOVE.B   #3,ACIA1             MASTER RESETS THE ACIA
         MOVE.B   #ACIAOM,ACIA1        SETS THE OPERATING MODE

*BELOW A ROUTINE TO SET UP THE TIMER

         CLR.L    D0
         CLR.L    D1
         MOVE.W   #TIMCNT,D0           1 MS TIME COUNT VALUE
         MOVE.W   D0,D1                WILL USE LOWER BYTE D1
         LSR      #8,D0                UPPER TIME COUNT BYTE TO D0
         MOVE.B   #1,TIMER+2           RESET TIMER
         MOVE.B   #TIMODE,TIMER        SET TIMER MODE
         MOVE.B   D0,TIMER+4           UPPER TIME BYTE
         MOVE.B   D1,TIMER+6           LOWER TIME BYTE
         MOVE.B   TIMER+2,D0
         MOVE.B   TIMER+4,D0           READ RESETS TIMER INTERRUPT
         MOVE.B   #0,TIMER+2           ENABLES WRITE TO CR3
         MOVE.B   #$81,TIMER           EXT CLOCK/8
         MOVE.B   #$FF,TIMER+12        WRITE TO MSB BUFFER,INITIALIZE
         MOVE.B   #$FF,TIMER+14        WRITE TO #3 LATCH,INITIALIZE

*BELOW A ROUTINE TO INITIALIZE CERTAIN RAM LOCATIONS

         LEA      WRITEBUF,A0          WRITE BUFFER BASE ADDRESS
         MOVE.B   #$0D,(A0)+           FIRST CHARACTER TO BE SENT TO AB
         MOVE.B   #$3A,(A0)            SECOND CHAR
         MOVE.B   #$0D,4(A0)           CHAR FOLLOWING TEXT TO AB (LAST CHAR)
         CLR.B    MSTAT                CLEAR MEASUREMENT STATUS
         CLR.B    SSTAT                CLEAR SEQUENCE STATUS
         MOVE.B   #DIMTOL,TOLADJ       TOLADJ USED IN CALCULATIONS

WAIT     STOP     #SETSTAT             SR=2000,ALL INTERRUPTS ENABLED
         JMP      WAIT

MAIN     MOVEM.L  A0-A6/D0-D7,-(A7)    MOVE REG TO STACK
         CLR      D0
         MOVE.B   SSTAT,D0             GET SEQUENCE STATUS
         CMPI.B   #0,D0                TEST IF SEQUENCE GREATER THAN ZERO
         BNE      TIMCT                IF SO THEN BRANCH
         JMP      RESTR                ELSE JUMP

SERI     CLR.L    D2
         MOVE.L   #2,D1                CHARACTER COUNTER
         MOVE.L   #$7CF,D0             TIME COUNT FOR NO CHAR INPUT
         LEA      READBUF,A0           BASE ADDRESS FOR READ BUFFER
         MOVE.L   #ACIA1,A1            BASE ADDRESS FOR SERIAL PORT
RDY1     BTST     #0,(A1)              TEST IF CHAR READY
         BEQ.S    TIM1                 IF NOT BRANCH TO TIMER
         MOVE.L   #$7CF,D0             IF SO RESET TIMER
         MOVE.B   2(A1),D2             AND GET CHARACTER
         CMPI.B   #$02,D2              TEST IF FIRST LEGAL CHARACTER
         BEQ      RDY1                 IF SO BRANCH TO GET NEXT CHAR
```

```
         CMPI.B    #$20,D2            IF NOT TEST IF SECOND CHAR
         BNE       COMERR             IF NOT SECOND CHAR THEN ERROR
RDY2     BTST      #0,(A1)            TEST IF TEXT CHARACTER READY
         BEQ.S     TIM2               IF NOT BRANCH TO TIMER
         MOVE.L    #$7CF,DO           IF SO RESET TIMER
         MOVE.B    2(A1),D2           AND GET CHARACTER
         CMPI.B    #$30,D2            TEST IF LESS THAN LOWEST ASCII NUMBER
         BLT       COMERR             AND BRANCH IF SO
         CMPI.B    #$39,D2            TEST IF GREATER THAN ASCII NUMBER
         BGT       COMERR             AND BRANCH IF SO
         MOVE.B    D2,(AO)+           MOVE LEGAL ASCII NUMBER TO BUFFER
         DBF       D1,RDY2            IF NOT LAST TEXT NUMBER GET ANOTHER
RDY3     BTST      #0,(A1)            OTHERWISE TEST FOR NEXT CHARACTER READY
         BEQ.S     TIM3               IF NOT GO TO TIMER
         MOVE.B    2(A1),D2           OTHERWISE GET CHARACTER
         MOVE.L    #$7CF,DO           RESET TIMER
         CMPI.B    #$30,D2            TEST FOR ANOTHER NUMERICAL DIGIT
         BGE       COMERR             IF SO COMMUNICATIONS ERROR
         CMPI.B    #$20,D2            TEST IF NEXT TO LAST CHARACTER
         BEQ.S     RDY3               IF SO READ LAST CHARACTER
         CMPI.B    #$03,D2            TEST IF LAST CHARACTER
         BNE       COMERR             IF NOT INDICATE COMMUNICATIONS ERROR
         BRA.S     SERT               IF SO GO BACK TO PROCESS INTERRUPT
TIM1     DBF       DO,RDY1            TEST CHARACTER READY AGAIN IF NO TIMEOUT
         BRA       COMERR             IF TIMEOUT INDICATE ERROR
TIM2     DBF       DO,RDY2
         BRA       COMERR             AS ABOVE ONLY NEXT SECTION
TIM3     DBF       DO,RDY3
         BRA       COMERR             AS ABOVE ONLY LAST SECTION

CALIB    BSET      #4,MSTAT           SET CALIBRATE MODE
         BCLR      #7,FASNO           CLEAR CALIB BIT FROM FAS NUMBER
         BRA       ENTRY

TIMCT    CLR       D1
         MOVE.W    PACER,D1           GET PRESENT TIME DELAY
         DBEQ      D1,TIMON           BRANCH IF NOT AT END OF 75MS DELAY
         MOVE.W    #INHIB,SR          MASK INTERRUPTS
         BTST      #1,SSTAT           TEST IF IN SEQUENCE 2
         BNE       DIAM               IF SO BRANCH TO DIAMETER ROUTINE
         MOVE.B    #5,SSTAT           ELSE SET SEQUENCE TO 5
         JMP       HEAD               AND GO TO HEAD DIAMETER ROUTINE
TIMON    MOVE.W    D1,PACER           DECREMENT AND STORE TIME COUNT
         JMP       RESTR              RESTORE STACK
ABINT    MOVEM.L   AO-A6/DO-D7,-(A7)  STORE REG ON STACK (INTER LEVEL 6)
         MOVE.W    #INHIB,SR          MASK INTERRUPTS
         BRA       SERI               BRANCH TO SERIAL INPUT
SERT     LEA       READBUF,A1         BASE ADDRESS OF READ BUFFER IN A1
         LEA       WRITEBUF+2,AO      FIRST TEXT LOCATION IN WRITE BUFFER
         MOVE.B    (A1)+,(AO)+        MOVE FASTENER DATA FROM READ TO WRITE
         MOVE.B    (A1)+,(AO)+        BUFFER FOR LATER TRANSMISSION IF GOOD
         MOVE.B    (A1),(AO)          FASTENER DETECTED
         LEA       READBUF,A1         RELOAD READ BUFFER BASE ADDR
         LEA       READBUF+3,AO       AREA FOR BCD AFTER CONV FROM ASCII
         CLR.L     DO
         MOVE.B    (A1)+,DO           GET FIRST ASCII CHARACTER
         SUB.B     #$30,DO            CONVERT TO BCD
         MOVE.B    DO,(AO)+           AND STORE IT
         MOVE.B    (A1)+,DO
         SUB.B     #$30,DO            SAME FOR SECOND DIGIT
         MOVE.B    DO,(AO)+
         MOVE.B    (A1),DO
         SUB.B     #$30,DO            AND LAST CHARACTER
         MOVE.B    DO,(AO)
         BSR.S     ASCBIN             BRANCH TO ASCII TO BINARY CONVERTER
         CLR.L     DO
         MOVE.B    FASNO,DO           GET THE NEW FASTENER NUMBER
         BTST      #7,DO              TEST IF CALIBRATE MODE REQUIRED
         BNE       CALIB              IF SO BRANCH
         CMPI.B    #$64,DO            TEST TO MAKE SURE FAS NUM LESS THAN 100
         BGT       COMERR             ERROR IF GREATER THAN 100
         JMP       ENTRY              ELSE DO PROGRAM
```

```
ASCBIN   CLR.L     D1
         LEA       READBUF+3,A0          BCD BUFFER ADDR (READ BUFFER +3)
         MOVE.B    (A0)+,D1              GET FIRST DIGIT
         MULU      #10,D1                RAISE TO 2ND POWER OF 10
         ADD.B     (A0)+,D1              ADD UNITS (SECOND DIGIT)
         MULU      #10,D1                RAISE TO NEXT POWER OF 10
         ADD.B     (A0),D1               ADD FINAL UNITS
         MOVE.B    D1,FASNO              STORE BINARY NUMBER AS FASTENER NUMBER
         RTS                             RETURN FROM SUBROUTINE

CMDINT   MOVEM.L   A0-A6/D0-D7,-(A7)     MOVE REG TO STACK (INTERRUPT LEVEL 5)
         MOVE.W    #INHIB,SR             MASK INTERRUPTS
         CLR.L     D1
         MOVE.B    PIA0,D1               INPUT COMMAND BYTE
         MOVE.B    #255,DOPW             ALL BITS HIGH (ACTIVE LOW)
         MOVE.B    DOPW,PIA0+2           CLEAR OUTPUT INDICATORS
         CLR.B     MSTAT
         CLR.B     SSTAT
         CMPI.B    #0,D1                 TEST IF A/D CALIBRATE MODE REQUEST
         BEQ.S     ADCAL                 BRANCH TO SERVICE IF REQUESTED
         MOVE.B    D1,FASNO              STORE FASTENER NUMBER
         BTST      #7,D1                 MEAS/CALIB STATUS BIT
         BNE       CALIB                 IF HIGH, BRANCH TO CALIBRATE
         BRA       ENTRY

ADCAL    LEA       ADADDR,A0             A/D CONVERTER BASE ADDRESS
         MOVE.B    #0,2(A0)              CLEAR LAST CHANNEL
         MOVE.B    #4,1(A0)              SET CHAN 4 AS INPUT CHAN
         MOVE.B    #1,(A0)               START CONVERSION
RSET     CLR.L     D2
         CLR.L     D0
         MOVE.L    #5,D2                 SET FOR 6 SAMPLES TO AVG
POLE     CLR.L     D4
         CLR.L     D5
         BTST      #7,(A0)               TEST IF DATA READY
         BEQ.S     POLE                  TEST AGAIN IF NOT READY
         MOVE.B    4(A0),D4              READ LOW BYTE
         MOVE.B    5(A0),D5              READ HIGH BYTE
         ASR.W     #4,D4                 ALIGN BYTES TO ALIGN
         ASL.W     #4,D5
         ADD.W     D4,D5                 COMBINE BYTES FOR WORD VALUE
         ADD.L     D5,D0                 ADD TO ACCUMULATOR
         DBRA      D2,POLE               TEST IF 6 SAMPLES YET
         MOVE.L    #6,D6                 IF SO
         DIVU      D6,D0                 CALCULATE AVERAGE
         MOVE.B    PIA0,D1               GET SWITCH SETTINGS
         CMPI.B    #0,D1                 TEST IF SET FOR OFFSET ADJUSTMENT
         BNE.S     RANGE                 BRANCH IF NOT
OUTSTA   CMPI.B    #10,D0                TEST IF EQUAL OR GREATER THAN 10
         BGE.S     OMGT                  IF SO, OUTPUT MUCH GREATER THAN
         CMPI.B    #4,D0                 TEST IF EQUAL OR GREATER THAN 4
         BGE.S     OGT                   IF SO, OUTPUT GREATER THAN
         CMPI.B    #1,D0                 TEST IF GREATER THAN 1
         BGT.S     OC                    IF SO, OUTPUT CLOSE
         CMPI.B    #1,D0                 TEST IF EQUAL TO ONE OR ZERO
         BEQ.S     OOK                   IF SO, OUTPUT OK
         CMPI.B    #0,D0
         BEQ.S     OOK
         BRA       RSET                  RESAMPLE A/D CONVERTER
RANGE    CMPI.B    #1,D1                 TEST IF CAL FINISHED
         BGT       RESTR                 IF SO, BRANCH TO RESTORE REGISTERS
         MOVE.L    #$FFF,D7              RANGE SETTING ADJUSTMENT
         SUB.W     D7,D0                 SUB MEASURED VALUE AND RANGE ADJ SET
         BSR       ABSOL                 GET ABSOLUTE DIFFERENCE
         BRA       OUTSTA                BRANCH TO OUTPUT STATUS
OMGT     MOVE.B    #0,PIA0+2             LIGHT ALL LED'S
         BRA       RSET                  SAMPLE A/C CONVERTER AGAIN
OGT      MOVE.B    #$F0,PIA0+2           LIGHT LOWER NIBBLE OF LED'S
         BRA       RSET
OC       MOVE.B    #$FC,PIA0+2           LIGHT LOWER TWO BITS OF LED'S
         BRA       RSET
OOK      MOVE.B    #$FE,PIA0+2           LIGHT LOWEST BIT OF LED'S
         BRA       RSET
```

```
REJECT   MOVE.B   #$FD,DOPW            BIT CODE FOR REJECT FASTERER
         MOVE.B   DOPW,PIA0+2          OUTPUT BYTE
         LEA      WRITEBUF+2,A0        ADDRESS OF FIRST TEXT CHAR WRITE BUFFER
         MOVE.B   #$30,(A0)+
         MOVE.B   #$30,(A0)+           REJECT CODE = ASCII 000
         MOVE.B   #$30,(A0)
         BSR      SERO                 BRANCH TO SERIAL OUTPUT SUBROUTINE
         CLR.B    MSTAT
         CLR.B    SSTAT
         JMP      RESTR

*BELOW A ROUTINE TO INDICATE A COMMUNICATIONS ERROR BETWEEN THE AB PLC AND
*THE OMNIBYTE SBC.

COMERR   LEA      WRITEBUF+2,A0        START OF TEXT IN WRITE BUFFER
         MOVE.B   #$39,(A0)+
         MOVE.B   #$39,(A0)+           COM ERROR = ASCII 999
         MOVE.B   #$39,(A0)
         BSR      SERO                 BRANCH TO SERIAL OUTPUT SUBROUTINE
ERG      MOVE.B   ACIA1+2,D0           READ ACIA DATA BYTE
         MOVE.B   #$FF,D0
RD       NOP
         DBF      D0,RD
         CLR.L    D0
         MOVE.B   ACIA1,D0             READ ACIA STATUS BYTE
         BTST     #0,D0                TEST IF RECEIVE BUFFER FULL
         BNE.S    ERG                  BRANCH TO EMPTY REGISTER IF SET
         JMP      RESTR                JUMP TO RESTORE REG AND WAIT STATE

*BELOW A SUBROUTINE TO SET UP THE A/D CONVERTER FOR SINGLE CHAN OPERATION

STLP1    BCLR     #0,MSTAT             SINGLE CHAN A/D MODE
         MOVE.L   #ADADDR,A0           A/D CONV BASE ADDRESS
         MOVE.B   #0,2(A0)             CLEAR LAST CHANNEL
         MOVE.B   #0,1(A0)             SET CHAN 0, UNITY GAIN
         MOVE.B   #1,(A0)              START CONVERSION
         RTS                           RETURN FROM SUBROUTINE

*BELOW A SUBROUTINE TO SET UP THE A/D CONVERTER FOR 2 CHAN OPERATION

STLP2    BSET     #0,MSTAT             TWO CHAN A/D MODE
         MOVE.L   #ADADDR,A0           A/D CONV BASE ADDRESS
         MOVE.B   #0,(A0)              CLEAR OLD COMMAND
         MOVE.B   #1,2(A0)             SET LAST CHAN = 1
         MOVE.B   #0,1(A0)             SELECT CHAN 0 START,UNITY GAIN
         MOVE.B   #3,(A0)              START CONVERSION,AUTO INCREMENT
         RTS                           RETURN FROM SUBROUTINE

*BELOW A ROUTINE TO RESTORE THE STACK AND RETURN FROM EXCEPTION PROCESSING

RESTR    MOVE.B   TIMER+2,D0           READ TIMER TO RESET INTERRUPT (INT 4)
         MOVE.B   TIMER+4,D0
         MOVEM.L  (A7)+,A0-A6/D0-D7    RESTORE REG FROM STACK
         RTE                           RETURN FROM EXCEPTION

*BELOW A SUBROUTINE TO READ SINGLE CHAN A/D CONVERSIONS. (LOOP COUNT IN D5)

RDLP1    CLR.L    D0
         CLR.L    D1
         CLR.L    D2
         MOVE.L   #ADADDR,A0           A/D CONV BASE ADDRESS
DRDY1    BTST     #7,(A0)              TEST IF CONVERSION FINISHED
         BEQ      DRDY1                BRANCH IF DATA NOT READY
         MOVE.B   4(A0),D0             ELSE READ LOW DATA BYTE
         MOVE.B   5(A0),D1             HIGH DATA BYTE
         ASR.W    #4,D0                ALIGN LEAST SIG 4 BITS TO ZERO BIT
         ASL.W    #4,D1                ALIGN TO LOW DATA BYTE
         ADD.W    D0,D1                12 BIT A/D WORD IN D1
         ADD.L    D1,D2                ACCUMULATED RVDT IN D2 FOR AVG
         CLR.L    D0
         CLR.L    D1
         DBRA     D5,DRDY1             ANOTHER CONV IF LOOP NOT ZERO
         RTS                           RETURN FROM SUBROUTINE
```

```
*BELOW A SUBROUTINE TO READ 2 CHAN A/D CONVERSIONS, (LOOP COUNT IN D5)
RDLP2    CLR.L     D0
         CLR.L     D1
         CLR.L     D2
         CLR.L     D3
         MOVE.L    #ADADDR,A0          A/D CONV BASE ADDRESS
DRDY2    BTST      #7,(A0)             TEST IF CONVERSION FINISHED
         BEQ       DRDY2               BRANCH IF DATA NOT READY
         BTST      #6,(A0)             TEST IF CHAN 1 OR CHAN 2 DATA
         BNE.S     LVDT                BRANCH IF CHAN 2
         MOVE.B    4(A0),D0            ELSE READ CHAN 1 LOW BYTE
         MOVE.B    5(A0),D1            READ HIGH BYTE
         ASR.W     #4,D0               BIT ALIGN
         ASL.W     #4,D1               BIT ALIGN
         ADD.W     D0,D1               12 BIT A/D IN D1
         ADD.L     D1,D2               ACCUM RVDT DATA IN D2 FOR AVG
         CLR.L     D0
         CLR.L     D1
         BRA       DRDY2               READ NEXT CHAN
LVDT     MOVE.B    4(A0),D0            READ LOW BYTE
         MOVE.B    5(A0),D1            READ HIGH BYTE
         ASR.W     #4,D0               BIT ALIGNMENT
         ASL.W     #4,D1               BIT ALIGNMENT
         ADD.W     D0,D1               12 BIT A/D IN D1
         ADD.L     D1,D3               ACCUM LVDT DATA IN D3 FOR AVG
         CLR.L     D0
         CLR.L     D1
         MOVE.B    #0,1(A0)            RESET A/D CONVERTER
         MOVE.B    #3,(A0)
         DBRA      D5,DRDY2            DO AGAIN IF COUNTER NOT ZERO
         RTS                           RETURN FROM SUBROUTINE

ENTRY    MOVE.B    FASNO,D1
         ADDI      #1,D1
         MOVE.B    D1,DOPW             OUTPUT FASTENER NUMBER (PIA PORT)
         NEG.B     DOPW                LOW ACTIVE OUTPUT
         MOVE.B    DOPW,PIA0+2
         CLR.L     D1
         MOVE.B    FASNO,D1            GET FASTENER NUMBER
         ASL       #1,D1               TABLE ADDR WORD BOUNDRY
         MOVE.L    #FINDX,A6           FASTENER INDEX TABLE BASE ADDRESS
         MOVE.W    0(A6,D1),FASCMD     FASTENER TABLE ADDRESS OF CMD WORD
         MOVE.B    #1,SSTAT            SET BASELINE MODE
         JMP       BASLIN

*BELOW A FASTENER INDEX TABLE. (100 POSSIBLE FASTENERS)

FINDX    DC.W      0                   NOT USED
         DC.W      $0000               1
         DC.W      $0010               2
         DC.W      $0020               3
         DC.W      0
         DC.W      0
         DC.W      0
         DC.W      0
         DC.W      0
         DC.W      0
         DC.W      $0091               10
         DC.W      $00A1               11
         DC.W      $00B1               12
         DC.W      $00C1               13
         DC.W      $00D1               14
         DC.W      $00E1               15
         DC.W      0
         DC.W      0
         DC.W      0
         DC.W      0
         DC.W      $0132               20
         DC.W      $0142               21
         DC.W      $0152               22
         DC.W      $0162               23
         DC.W      $0172               24
         DC.W      $0182               25
```

```
        DC.W    $0192              26
        DC.W    $01A2              27
        DC.W    0
        DC.W    0
        DC.W    $01D3              30
        DC.W    $01E3              31
        DC.W    $01F3              32
        DC.W    $0203              33
        DC.W    $0213              34
        DC.W    $0223              35
        DC.W    0
        DC.W    0
        DC.W    0
        DC.W    0
        DC.W    $0273              40
        DC.W    $0283              41
        DC.W    $0293              42
        DC.W    $02A3              43
        DC.W    $02B3              44
        DC.W    $02C3              45
        DC.W    0
        DC.W    0
        DC.W    0
        DC.W    0
        DC.W    $4314              50
        DC.W    $4324              51
        DC.W    $4334              52
        DC.W    $4344              53
        DC.W    $4354              54
        DC.W    $4364              55
        DC.W    $4374              56
        DC.W    0
        DC.W    0
        DC.W    0
        DC.W    $53B5              60
        DC.W    $53C5              61
        DC.W    $53D5              62
        DC.W    $53E5              63
        DC.W    $53F5              64
        DC.W    $5405              65
        DC.W    $5415              66
*BELOW A TABLE FOR FASTENER DIAMETER VALUES

TBLDIA  DC.W    $007C              THREE SIXTEENTHS RIVETS
        DC.W    $00E9              QUARTER RIVETS
        DC.W    $0150              FIVE SIXTEENTHS RIVETS
        DC.W    $01B3              THREE EIGHTS RIVETS
        DC.W    $00E3              QUARTER BOLTS
        DC.W    $013F              FIVE SIXTEENTHS BOLTS
        DC.W    0                  NOT PRESENTLY USED

*BELOW A TABLE FOR FASTENER LENGTH VALUES

TBLLEN  DC.W    $02A6              1
        DC.W    $026A              2
        DC.W    0                  3 NOT AVAILABLE FOR CALIBRATION
        DC.W    0
        DC.W    0
        DC.W    0
        DC.W    0
        DC.W    0
        DC.W    0
        DC.W    $0311              10
        DC.W    $033D              11
        DC.W    $0361              12
        DC.W    $0395              13
        DC.W    $03BA              14
        DC.W    $03EB              15
        DC.W    0
        DC.W    0
        DC.W    0
        DC.W    0
        DC.W    $0387              20
```

```
         DC.W      $03B3               21
         DC.W      $03DF               22
         DC.W      $040B               23
         DC.W      $0437               24
         DC.W      $0463               25
         DC.W      $048F               26
         DC.W      $04BB               27
         DC.W      0
         DC.W      0
         DC.W      $03FC               30
         DC.W      $0428               31
         DC.W      $0454               32
         DC.W      $0480               33
         DC.W      $04AC               34
         DC.W      $04D8               35
         DC.W      0
         DC.W      0
         DC.W      0
         DC.W      0
         DC.W      $0504               40
         DC.W      $0530               41
         DC.W      $055C               42
         DC.W      $0588               43
         DC.W      $05B4               44
         DC.W      $05E0               45
         DC.W      0
         DC.W      0
         DC.W      0
         DC.W      0
         DC.W      $021A               50 NOT AVAILABLE FOR CALIBRATION
         DC.W      $0246               51 NOT AVAILABLE FOR CALIBRATION
         DC.W      $0272               52
         DC.W      $029E               53
         DC.W      $02CA               54
         DC.W      $02F6               55
         DC.W      $0322               56
         DC.W      0
         DC.W      0
         DC.W      0
         DC.W      $030C               60
         DC.W      $0338               61
         DC.W      $0364               62
         DC.W      $0390               63
         DC.W      $03BC               64
         DC.W      $03E8               65
         DC.W      $0414               66

*BELOW A TABLE FOR BOLT HEAD DIAMETER VALUES

TBLHED   DC.W      $01A7               QUARTER BOLTS
         DC.W      $0223               FIVE SIXTEENTHS BOLTS
         DC.W      0                   NOT PRESENTLY USED
         DC.W      0                   NOT PRESENTLY USED

*BELOW THE ROUTINE FOR ESTABLISHING THE BASELINE VALUE FOR THE RVDT.   IT
*LOOKS FOR FASTENER CONTACT WITH THE RVDT (BASELINE DEPARTURE).

BASLIN   BSR       STLP1               SUBROUTINE FOR A/D SETUP
INILOP1  CLR.L     D5
         MOVE.W    #LOOPCT,D5          SET NO OF A/D VALUES TO AVG
         BSR       RDLP1               SUBROUTINE TO READ A/D DATA
         MOVE.W    #LOOPCT,D5
         ADDI.B    #1,D5
         DIVU      D5,D2               VALUE=ACCUM/LOOP COUNT + 1
         BTST      #5,MSTAT            TEST IF FIRST TIME THROUGH LOOP AVG
         BNE.S     COMP                IF NOT GO TO COMPARE FOR SLOPE
         MOVE.W    D2,RVDTBL           FIRST TIME THROUGH ESTABLISHES THE
*                                      BASELINE VALUE FOR THE RVDT (ZERO).
         BSET      #5,MSTAT            SET BIT 5 = BASELINE RECORDED
         BRA       INILOP1
COMP     MOVE.W    D2,LASTR            LAST RVDT READING
         MOVE.W    RVDTBL,D4           GET THE BASELINE VALUE
         SUB.W     D4,D2               FIND DIFFERENCE
```

```
          CLR.L      D6
          MOVE.B     #THRESH,D6          GET THE THRESHOLD VALUE FOR DEPARTURE
          CMP.W      D6,D2               SEE IF DIFF GREATER THAN THRESHOLD
          BGT.S      DIAM                INCREMENT SEQUENCE STATUS IF DEPARTURE
          BRA.S      INILOP1             ELSE READ A/D AGAIN
          NOP

*BELOW A ROUTINE FOR FINDING THE FULL INITIAL DIAMETER OF THE FASTENER
DIAM      MOVE.B     #2,SSTAT
          BSR        STLP2               SUBROUTINE FOR 2 CHAN A/D SETUP
INILOP2   CLR.L      D5
          MOVE.W     #LOOPCT,D5          SET 6 SAMPLES PER VALUE
          BSR        RDLP2               SUBROUTINE FOR READING 2 CHAN A/D DATA
          MOVE.W     #LOOPCT,D6
          ADDI       #1,D6
          DIVU       D6,D3               LVDT AVG = ACCUM LVDT/LOOP COUNT +1
          DIVU       D6,D2               RVDT AVG = ACCUM RVDT/LOOP COUNT +1
          BTST       #6,MSTAT            TEST IF FIRST READLOOP IN DIA SEQUENCE
          BNE.S      CKDIA               IF NOT SKIP TO CHECK DIAM
          MOVE.W     D3,LVDT1            RECORD FIRST LENGTH VALUE
          BSET       #6,MSTAT            SET SO VALUE WON'T GET RECORDED AGAIN
          BTST       #14,FASCMD          TEST IF RIVET OR BOLT
          BEQ.S      CKDIA               BRANCH IF RIVET
          MOVE.W     #15,PACER           ELSE LOAD PACER FOR 15 MS DELAY
          JMP        RESTR
CKDIA     MOVE.W     LASTR,D4            GET LAST RVDT READING
          CMP.W      D4,D2               CHECK SLOPE
          BGT        REDO                IF SLOPE POS SAMPLE AND COMPARE AGAIN
          BTST       #14,FASCMD          TEST IF RIVET OR BOLT
          BEQ        RIV                 BRANCH IF RIVET
          BTST       #1,MSTAT            CHECK IF FIRST IND OF SLOPE CHANGE
          BEQ        SECTR               IF SO DO SECOND TRY
          BCLR       #1,MSTAT            IF SECOND, CLEAR IND AND CONTINUE
COMDIA    CLR.L      D3
          CLR.L      D2
          MOVE.W     RVDTBL,D3           GET BASELINE REFERENCE
          MOVE.W     RVDTPL,D2           GET PEAK VALUE
          SUB.W      D3,D2               DIAM = PEAK MINUS BASELINE
          BTST       #4,MSTAT            TEST IF CALIB OR MEAS
          BNE        CALDIA              BRANCH IF CALIBRATE
          CLR.L      D5
          MOVE.W     FASCMD,D5           GET FASTENER CMD WORD
          ANDI.W     #$F,D5              MASK FOR DIAM INFO
          ASL        #1,D5               ALIGN TO WORD BOUNDRY
          LEA        TBLDIA,A3           BASE ADDR OF DIAM TABLE
          MOVE.W     0(A3,D5),D0         DIAM TABLE REF IN D0
          SUB.W      D2,D0               FIND DIFF REF AND MEAS VALUE
          BSR        ABSOL               GET ABSOLUTE DIFF VALUE
          CLR.L      D6
          MOVE.B     TOLADJ,D6           GET TOLERANCE VALUE
          CMP.B      D6,D0               DIFF OF TOLER AND MEAS VALUE
          BGT        REJECT
DIACON    BSET       #2,MSTAT            ELSE SET FOR NEG SLOPE
          BTST       #14,FASCMD          TEST IF RIVET OR BOLT
          BNE.S      BOLT                BRANCH IF BOLT
          MOVE.B     #5,SSTAT            ELSE FINISH WITH LENTH MEAS
          MOVE.W     RVDTPL,LASTR        INITIAL DIAMETER VALUE
          JMP        HEAD                AND CONTINUE
RIV       MOVE.W     D2,RVDTPL           STORE FOR DIA CALCULATION
          BRA.S      COMDIA
SECTR     BSET       #1,MSTAT
          MOVE.W     LASTR,RVDTPL        STORE PEAK VALUE
          MOVE.W     D3,LASTL            STORE LATEST LVDT VALUE
          MOVE.W     D2,LASTR            AND LATEST RVDT VALUE
          BRA        INILOP2
BOLT      MOVE.B     #3,SSTAT            READY TO CHECK FOR THREADS
          JMP        THRD
REDO      MOVE.W     D2,LASTR            LAST RVDT = ACCUM RVDT
          MOVE.W     D3,LASTL
          BCLR       #1,MSTAT
          BRA        INILOP2
CALDIA    LEA        DIACAL,A4           RAM ADDR FOR DIAMETER INFO
```

```
        MOVE.W   D2,(A4)              STORE DIAM INFO
        BRA      DIACON

* A SUBROUTINE TO RETURN AN ABSOLUTE VALUE TO DO

ABSOL   BMI.S    INVER                TEST IF DO NEGATIVE
        RTS                           IF NOT RETURN
INVER   NEG.W    DO                   IF SO INVERT IT
        RTS                           THEN RETURN

*BELOW A ROUTINE FOR DETECTING THREADS IF FASTENER TYPE IS A BOLT

THRD    BSR      STLP1                SET A/D FOR SINGLE CHAN MODE
        CLR.L    D6
        MOVE.B   #10,D6               SET UP THREAD TIMER
        CLR.L    D4
        MOVE.B   #3,D4                SET THREAD COUNTER
INILOP3 MOVE.W   #LLOPCT,D5           GET LONG LOOP COUNT
        BSR      RDLP1                SUBROUTINE FOR READING SING CHAN DATA
        SUB.B    #1,D6                DECREMENT THREAD TIMER
        MOVE.W   #LLOPCT,D5
        ADDI.W   #1,D5
        DIVU     D5,D2                RVDT AVG = RVDT ACCUM/LLOP COUNTER+1
        CLR.L    D7
        MOVE.W   D2,D7                DATA POINT IN DO (AND D2)
        MOVE.W   LASTR,D3
        SUB.W    D3,D2                COMPARE LAST RVDT WITH ACCUM RVDT
        BPL.S    PLUS                 BRANCH IF POSITIVE
        BSET     #3,MSTAT             SET NEGATIVE SLOPE DETECTED BIT
        NEG      D2                   MAKE DIFFERENCE POSITIVE
        BRA.S    BYPASS
PLUS    BCLR     #3,MSTAT             SET POSITIVE SLOPE DETECTED
BYPASS  CMPI.W   #3,D2                COMPARE WITH 15MV
        BGT.S    SLOPS                IF MORE THAN 15MV CHANGE CHECK SLOPE
        CMPI.W   #0,D6                ELSE CHECK IF THREAD TIMER ZERO
        BNE      INILOP3              IF NOT, READ MORE A/D DATA
        JMP      REJECT               IF NO THREADS DETECTED, REJECT
SLOPS   MOVE.B   #10,D6               RESET THREAD TIMER SINCE SLOPE DET
        BTST     #2,MSTAT             TEST SLOPE REFERENCE
        BNE.S    NEG                  BRANCH IF NEGATIVE SLOPE REFERENCE
        BTST     #3,MSTAT             TEST ACTUAL SLOPE
        BNE.S    OPPOS                IF NOT ALSO POSITIVE
SAME    MOVE.W   D7,LASTR             LAST RVDT = ACCUM RVDT
        BTST     #1,MSTAT
        BEQ      INILOP3              CLEAR BIT UNLESS SLOPE OPPOSITE MORE
        BCLR     #1,MSTAT             THAN ONCE
        JMP      INILOP3              GET MORE A/D DATA
NEG     BTST     #3,MSTAT             TEST ACTUAL SLOPE
        BNE.S    SAME                 BRANCH IF BOTH NEG
OPPOS   BTST     #1,MSTAT             TEST IF FIRST TIME DIFFERENT SLOPE
        BNE.S    CHANGE               IF NOT BRANCH
        BSET     #1,MSTAT             ELSE SET BIT 1
        BRA      INILOP3              AND READ A/D AGAIN
CHANGE  BTST     #2,MSTAT             TEST ACTUAL SLOPE
        BNE.S    NEGREF               BRANCH IF NEGATIVE
        MOVE.W   LASTR,RVDTPL         POS PEAK = LAST RVDT
        BRA.S    CLEAR
NEGREF  MOVE.W   LASTR,RVDTMI         NEG PEAK = LAST RVDT
CLEAR   MOVE.W   D7,LASTR             LAST RVDT = ACCUM RVDT
        BCLR     #1,MSTAT
        BCHG     #2,MSTAT             CHANGE SLOPE REFERENCE
        DBRA     D4,INILOP3           IF LESS THAN 2 FULL THREADS READ
        CLR.L    DO                   MORE A/D DATA
        CLR.L    D1
        MOVE.W   RVDTPL,DO            ELSE GET POSITIVE PEAK
        MOVE.W   RVDTMI,D1            AND NEG PEAK
        SUB.W    D1,DO                AND FIND THE DIFFERENCE
        CMPI.W   #4,DO                COMPARE DIFFERENCE WITH 20MV
        BLT      REJECT               REJECT IF LESS THAN 30MV
DELY    MOVE.B   #4,SSTAT             SET TO 75 MS DELAY MODE
        MOVE.W   #DLYCT,PACER         LOAD DELAY COUNTER
        JMP      RESTR
```

```
*BELOW THE ROUTINE FOR MEASURING THE HEAD DIAMETER AND FASTENER LENGTH IF
*A BOLT, OR IF A RIVET, JUST THE LENGTH; AND COMPLETING THE SELECTION PROCESS.

HEAD     BSR      STLP2            SUBROUTINE FOR 2 CHAN A/D MEASUREMENTS
         CLR.L    D5
INILOP4  MOVE.B   #LOOPCT,D5       SET UP LOOP COUNTER
         BSR      RDLP2            SUBROUTINE FOR READING 2 CHAN A/D DATA
         CLR.L    D6
         MOVE.B   #LOOPCT,D6
         ADDI.B   #1,D6
         DIVU     D6,D3            LVDT AVG = ACCUM LVDT/LOOP COUNT + 1
         DIVU     D6,D2            RVDT AVG = ACCUM RVDT/LOOP COUNT + 1
         BTST     #14,FASCMD       TEST IF RIVET OR BOLT
         BEQ      RIVET            BRANCH IF RIVET
         CLR.L    D4
         MOVE.W   LASTR,D4         GET LAST RVDT
         CMP.W    D4,D2            COMPARE LAST RVDT WITH ACCUM RVDT
         BGT.S    REMEA            IF ACCUM RVDT > LAST RVDT BRANCH
         BTST     #1,MSTAT
         BEQ.S    DOAGN            CHECK SLOPE AGAIN TO BE SURE
         SUB.W    D2,D4            ONE MORE CHECK TO SEE IF DIFFERENCE
         CMPI.W   #3,D4            BETWEEN CURRENT RVDT AND LAST RVDT
         BLT.S    REMEA            IS AT LEAST 15MV FOR NOISE IMMUNITY
         MOVE.W   LASTR,D4         GET LAST RVDT AGAIN
         MOVE.W   RVDTBL,D2        GET BASELINE VALUE
         SUB.W    D2,D4            HEAD EQU RVDT MINUS BASELINE
         BCLR     #1,MSTAT
         BTST     #4,MSTAT         TEST IF MEAS OR CALIB MODE
         BNE.S    CALHD            BRANCH IF IN CALIBRATE MODE
         LEA      TBLHED,A3        BASE ADDRESS OF HEAD DIAMETER TABLE
         CLR.L    D5
         MOVE.W   FASCMD,D5        GET FASTENER COMMAND DATA
         ANDI.W   #$3000,D5        MASK FOR HEAD DIAMETER INFO
         ASR.W    #8,D5            ALIGN HEAD DIAM INDEX BITS
         ASR.W    #3,D5
         MOVE.W   0(A3,D5),D6      HEAD DIAMETER TABLE ADDRESS
         MOVE.L   D6,D0
         SUB.W    D4,D0            FIND ACCUM - DIFFERECE TABLE VAL
         BSR      ABSOL            GET ABSOLUTE VALUE
         CLR.L    D6
         MOVE.B   TOLADJ,D6
         CMP.B    D6,D0            COMPARE RESULT WITH TOLERENCE
         BGT      REJECT           REJECT IF OUT OF TOLERENCE
         BRA.S    LEN              ELSE CHECK LENGTH
DOAGN    BSET     #1,MSTAT
         CLR.L    D5
         BRA      INILOP4          TAKE ANOTHER MEASUREMENT
REMEA    MOVE.W   D2,LASTR         LAST RVDT = ACCUM RVDT
         MOVE.W   D3,LASTL         LAST LVDT = ACCUM LVDT
         BCLR     #1,MSTAT
         CLR.L    D5
         BRA      INILOP4
CALHD    LEA      HEDCAL,A4        ADDR HEAD DIAMETER CALIB DATA
         MOVE.W   D4,(A4)
         BRA.S    LEN
RIVET    MOVE.W   LASTR,D4         GET LAST RVDT
         CLR.L    D5
         SUB.W    D2,D4            FIND DIFF ACCUM RVDT - LAST RVDT
         MOVE.L   D4,D0
         BSR      ABSOL            FOR LARGE FIN ON SMALL RIVETS
         MOVE.L   D0,D4
         CMPI.W   #5,D4            COMPARE DIFF WITH 25 MV
         BLT      REMEA            REDO A/D IF LESS 25 MV CHANGE
         MOVE.W   D3,LASTL
LEN      CLR.L    D4               ELSE GO ON TO CALC LENGTH
         CLR.L    D3
         MOVE.W   LVDT1,D4         GET LVDT READING AT OTHER END OF FAS
         MOVE.W   LASTL,D3         LAST LVDT READING
         SUB.W    D3,D4            FASTENER LENGTH = LEN 2 - LEN 1
         BTST     #4,MSTAT         TEST IF MEAS OR CALIB
         BNE.S    CALLEN           BRANCH IF CALIBRATE
         MOVE.W   FASCMD,D5        GET FASTENER COMMAND WORD
         ANDI.W   #$FF0,D5         MASK FOR LENGTH INDEX
```

```
         ASR.W      #3,D5                   BIT ALIGNMENT
         LEA        TBLLEN,A5               LENGTH TABLE BASE ADDRESS
         MOVE.W     0(A5,D5),D6             ADDRESS OF TABLE LENGTH
         MOVE.L     D6,D0
         SUB.W      D4,D0                   FIND DIFF MEAS LEN - TABLE LENGTH
         BSR        ABSOL
         CLR.L      D6
         MOVE.B     TOLADJ,D6
         CMP.W      D6,D0                   COMPARE DIFF WITH TOLERENCE
         BGT        REJECT                  REJECT IF OUT OF TOLERENCE
         MOVE.B     #$FE,DOPW               ELSE CODE FOR GOOD FASTENER
         MOVE.B     DOPW,PIAO+2             AND OUTPUT TO PARALLEL PORT AND
         BSR.S      SERO                    OUTPUT TO SERIAL PORT
         BRA.S      CLRALL

*BELOW A SUBROUTINE TO OUTPUT THE WRITE BUFFER TO THE SERIAL PORT

SERO     CLR.L      D0
         MOVE.L     #5,D0                   SET UP BIT COUNTER
         MOVE.L     #ACIA1,A1               BASE ADDRESS OF THE SERIAL PORT TO A1
         LEA        WRITEBUF,A0             BASE ADDRESS OF THE WRITE BUFFER
READY    BTST       #1,(A1)                 TEST IF TRANSMIT BUFFER EMPTY
         BEQ.S      READY                   IF NOT BRANCH UNTIL IT IS
         MOVE.B     (A0)+,2(A1)             CHARACTER TO TRANSMIT DATA BUFFER
         DBF        D0,READY                IF NOT LAST CHARACTER DO AGAIN
         MOVE.B     #$FF,D0
MARG     NOP
         DBF        D0,MARG                 DELAY MARGIN TO EMPTY ACIA BUFFER
         RTS                                RETURN FROM SUBROUTINE

CALLEN   LEA        LENCAL,A6               RAM ADDR OF LENGTH CALIB DATA
         MOVE.W     D4,(A6)                 STORE CALIB DATA
         MOVE.B     #0,DOPW                 ALL LEDS LIT FOR CAL COMPLETE
         MOVE.B     DOPW,PIAO+2             OUTPUT TO PARALLEL PORT
CLRALL   CLR.B      MSTAT
         CLR.B      SSTAT
         JMP        RESTR
         END
PAGE     1     LIST VER  081282 4   10/ 3/86   07:35:14   SYS:0450..FSFSRAM.SA

**********************************************************************
*                                                                    *
*        68000 FASTENER SELECTION & FEED SYSTEM (FSFS)               *
*                                                                    *
*        This program is for providing RAM variable storage          *
*                                                                    *
*                                                                    *
*        The name of this file is FSFSRAM                            *
*                                                                    *
**********************************************************************

FSFSRAM  IDNT       1,0
         SECTION    2

*IDENTIFICATION OF VARIABLES

         XDEF       CHARPT      *B, CHARACTER POINTER
         XDEF       DIACAL      *W, DIAMETER CALIBRATION DATA
         XDEF       DOPW        *B, DATA OUTPUT WORD TO PIAO
         XDEF       FASCMD      *W, FASTENER NUMBER COMMAND WORD
         XDEF       FASNO       *B, FASTENER NUMBER
         XDEF       HEDCAL      *W, HEAD DIAM CALIBRATION DATA
         XDEF       LASTL       *W, LAST LVDT RECORDED
         XDEF       LASTR       *W, LAST RVDT RECORDED
         XDEF       LENCAL      *W, LENGTH CALIBRATION DATA
         XDEF       LVDT1       *W, INITIAL LENGTH MEAS POINT
         XDEF       PACER       *W, 100 MS DELAY TIME MARKER
         XDEF       MSTAT       *B, MEASUREMENT STATUS BYTE
         XDEF       SSTAT       *B, SEQUENCE STATUS BYTE
         XDEF       RVDTBL      *W, BASELINE FOR RVDT MEAS
         XDEF       RVDTMI      *W, NEG PEAK OF RVDT THREAD MEAS
         XDEF       RVDTPL      *W, POS PEAK OF RVDT THREAD MEAS
         XDEF       TOLADJ      *B, TRIMMED DIMENSION TOLERENCE
```

```
*TABLES DEFINED

         XDEF       READBUF    *8 BYTES, SERIAL COMMAND WORD INPUT
         XDEF       WRITEBUF   *8 BYTES, SERIAL RESPONSE OUTPUT WORD

*STORAGE ALLOCATION


JUNK     DC.L       $FFFFFFFF

         DS.W       0
CHARPT   DS.B       1          CHARACTER POINTER FOR SERIAL I/O
DOPW     DS.B       1          DATA OUTPUT BYTE
DIACAL   DS.W       1          DIAMETER CALIBRATION DATA TEMP STORAGE
FASCMD   DS.W       1          FASTENER NUMBER COMMAND (IDENT) WORD
HEDCAL   DS.W       1          HEAD DIAMETER CALIBRATION DATA TEMP STORAGE
LASTL    DS.W       1          LAST LVDT RECORDED
LASTR    DS.W       1          LAST RVDT RECORDED
LENCAL   DS.W       1          LENGTH CALIBRATION DATA TEMP STORAGE
LVDT1    DS.W       1          INITIAL LENGTH MEAS POINT (TO CALCULATE LENGTH)
PACER    DS.W       1          DELAY TIME MARKER FOR 100 MS DELAY MODE
MSTAT    DS.B       1          MEASUREMENT STATUS
SSTAT    DS.B       1          SEQUENCE STATUS
RVDTBL   DS.W       1          BASELINE REFERENCE FOR RVDT MEASUREMENTS
RVDTMI   DS.W       1          NEG PEAK STORAGE FOR THREAD MEASUREMENTS
RVDTPL   DS.W       1          POS PEAK STORAGE FOR THREAD MEASUREMENTS
TOLADJ   DS.B       1          TREMMER ADJUSTED DIMINSION TOLERANCE
FASNO    DS.B       1          FASTENER NUMBER

*TABLE DEFINITIONS

READBUF  DS.B       8          SERIAL COMMAND WORD INPUT BUFFER
WRITEBUF DS.B       8          SERIAL RESPONSE WORD OUTPUT BUFFER

         END
```

What is claimed is:

1. Apparatus for checking the profile of an article, comprising:
- a push member for engaging the article;
- drive means for moving the push member in a linear direction to push the article along a path;
- a linear transducer actuated by movement of the push member in said linear direction;
- a feeler having a free end positioned to be contacted by the article as the article moves along said path; said feeler being mounted to pivot about an axis in response to contact with the article; and
- a rotary transducer actuated by pivotal movement of the feeler about said axis caused by contact with the article.

2. Apparatus as described in claim 1, further comprising positioning means for moving the article into a position on said path located in the outfeed direction from the push member, to position the article to be engaged by the push member.

3. Apparatus as described in claim 2, in which the positioning means comprises guide means for guiding the article onto the infeed end of said path, and retarding means for retarding movement of the article along said path to enable the article to be engaged by the push member.

4. Apparatus for checking the profile of an article, comprising:
- a push member for engaging the article;
- drive means for moving the push member in a linear direction to push the article along a path;
- a linear transducer actuated by movement of the push member in said linear direction;
- a feeler mounted to pivot about an axis and having a free end positioned to be contacted by the article as the article moves along said path;
- a rotary transducer actuated by pivotal movement of the feeler about said axis caused by contact with the article; and
- a block having an upwardly facing channel that defines said path, and a slot extending longitudinally along the bottom of said channel; said push member comprising a blade that extends upwardly through said slot into said channel and is movable along said slot to push an article in said channel along said path.

5. Apparatus for checking the profile of an article, comprising:
- a push member for engaging the article;
- drive means for moving the push member in a linear direction to push the article along a path;
- a linear transducer actuated by movement of the push member in said linear direction;
- a feeler mounted to pivot about an axis and having a free end positioned to be contacted by the article as the article moves along said path;
- a rotary transducer actuated by pivotal movement of the feeler about said axis caused by contact with the article; and
- a V-shaped block; said block having an upwardly facing, downwardly tapering channel that defines said path, and a slot extending longitudinally along the bottom of said channel; and said push member comprising a blade that extends upwardly through said slot into said channel and is movable along said slot to push an article in said channel along said path.

6. Apparatus as described in claim 4, further comprising positioning means for positioning the article in said channel to be engaged by said blade.

7. Apparatus as described in claim 6, in which the positioning means comprises guide means for guiding the article onto the infeed end of said path, and retarding means for retarding movement of the article in said channel along said path to enable the article to be engaged by said blade.

8. Apparatus as described in claim 7, in which the retarding means comprises a pivotably mounted finger having a free end that extends downwardly and in an outfeed direction into said channel.

9. Apparatus as described in claim 1, in which the drive means comprises a reciprocating fluid actuated piston rod, the push member is attached to said piston rod to move therewith, and the linear transducer includes a shaft that extends parallel to and is spaced from said piston rod and that is attached to the push member.

10. Apparatus as described in claim 4, in which the drive means comprises a reciprocating fluid actuated piston rod, a portion of said blade below said channel is attached to said piston rod to move therewith, and the linear transducer includes a shaft that extends parallel to and is spaced from said piston rod and that is attached to said portion of said blade.

11. Apparatus as described in claim 1, in which the rotary transducer includes a shaft that defines said axis and is attached to the feeler to pivot therewith; in which the feeler is a finger that extends downwardly and in an outfeed direction from said shaft; and which further comprises biasing means for biasing said free end of the finger into said path.

12. Apparatus as described in claim 11, further comprising guide means for guiding the article onto the infeed end of said path, and retarding means for retarding movement of the article along said path to enable the article to be engaged by the push member, to control the speed at which the article contacts the finger.

13. Apparatus as described in claim 12, in which the retarding means comprises a pivotably mounted finger having a free end that extends downwardly and in an outfeed direction into said path.

14. Apparatus as described in claim 4, in which the rotary transducer includes a shaft that defines said axis and is attached to the feeler to pivot therewith; in which the feeler is a finger that extends downwardly and in an outfeed direction from said shaft; and which further comprises biasing means for biasing said free end of the finger into said path.

15. Apparatus as described in claim 14, further comprising guide means for guiding the article onto the infeed end of said path, and retarding means for retarding movement of the article in said channel along said path to enable the article to be engaged by said blade, to control the speed at which the article contacts the finger.

16. Apparatus as described in claim 15, in which the retarding means comprises a pivotably mounted finger having a free end that extends downwardly and in an outfeed direction into said channel.

17. Apparatus as described in claim 1, further comprising means for comparing output, produced by the linear transducer and the rotary transducer as the push member moves the article along said path and the article contacts the feeler, to a predetermined output.

18. Apparatus as described in claim 17, further comprising means for transporting the article to a location determined by the results of comparing said outputs.

19. Apparatus as described in claim 18, in which said means for transporting comprises a carriage, a plurality of conduits each of which has an infeed end mounted on the carriage, and drive means for moving the carriage to selectively position one of said infeed ends adjacent to the outfeed end of said path.

20. Apparatus as described in claim 4, further comprising means for selectively transporting the article to one of a plurality of locations; said means for transporting including a carriage, a plurality of conduits each of which has an infeed end mounted on the carriage, and carriage drive means for moving the carriage to selectively position one of said infeed ends adjacent to the outfeed end of said channel.

21. Apparatus as described in claim 20, further comprising means for comparing output from the linear transducer and the rotary transducer to a predetermined output and for signaling the carriage drive means to position said infeed ends in a manner determined by the results of comparing said outputs.

22. Apparatus as described in claim 1, in which the drive means moves the push member into engagement with the article and continues to move the push member to push the article along said path.

23. Apparatus as described in claim 1, in which the drive means and the push member push the article all the way past the feeler, and the linear transducer and the rotary transducer produce output substantially continuously at least from when the article first contacts the feeler until the article moves all the way past the feeler; and which further comprises means for comparing said output to a predetermined output corresponding to a desired profile of the article.

24. Apparatus as described in claim 23, further comprising means for transporting the article to a location determined by the results of comparing said outputs.

25. Apparatus as described in claim 24, in which said means for transporting comprises a carriage, a plurality of conduits each of which has an infeed end mounted on the carriage, and drive means for moving the carriage to selectively position one of said infeed ends adjacent to the outfeed end of said path.

* * * * *